(12) United States Patent
Kerr et al.

(10) Patent No.: US 9,264,134 B2
(45) Date of Patent: Feb. 16, 2016

(54) AUTOMATIC LASER SHUTDOWN AND RECOVERY IN RESPONSE TO A LINK BREAK

(75) Inventors: David Kerr, Ellicott City, MD (US); Mark LaLiberte, Columbia, MD (US); Avery Van Gieson, Laurel, MD (US); John Lai, Fulton, MD (US); Kim Jepsen, Ellicott City, MD (US); Wei Lu, Bear, DE (US); Yan Han, Laurel, MD (US); Marc Placidet, Columbia, MD (US); Ulrik Gliese, Columbia, MD (US); David Copeland, Silver Spring, MD (US); Guangning Yang, Clarksville, MD (US)

(73) Assignee: Infinera Corporation, Sunnyvale, CA (US)

( * ) Notice: Subject to any disclaimer, the term of this patent is extended or adjusted under 35 U.S.C. 154(b) by 1141 days.

(21) Appl. No.: 12/239,857

(22) Filed: Sep. 29, 2008

(65) Prior Publication Data

US 2010/0080553 A1  Apr. 1, 2010

(51) Int. Cl.
*H04B 17/00* (2015.01)
*H04B 10/077* (2013.01)
*H04B 10/071* (2013.01)

(52) U.S. Cl.
CPC .......... *H04B 10/0773* (2013.01); *H04B 10/071* (2013.01)

(58) Field of Classification Search
CPC .................................................. H04B 10/0773
USPC ........... 398/13, 17, 20, 10, 30, 31, 32, 33, 34, 398/37, 38, 181, 42, 41, 177
See application file for complete search history.

(56) References Cited

U.S. PATENT DOCUMENTS

| | | | |
|---|---|---|---|
| 2003/0081295 A1* | 5/2003 | Kamura | 359/174 |
| 2004/0042063 A1* | 3/2004 | Ohtani et al. | 359/341.3 |
| 2004/0208519 A1* | 10/2004 | Feldman et al. | 398/30 |
| 2004/0213567 A1* | 10/2004 | Deguchi et al. | 398/32 |
| 2005/0036790 A1* | 2/2005 | Tanaka et al. | 398/177 |
| 2005/0185957 A1* | 8/2005 | Ohtani et al. | 398/33 |

\* cited by examiner

*Primary Examiner* — Joshua King
(74) *Attorney, Agent, or Firm* — Harrity & Harrity LLP; David L. Soltz

(57) ABSTRACT

A communication system may include a first control circuit to detect a break on a first optical link; a first optical source to supply a first optical signal on a second optical link in response to detecting the break on the first optical link, the first optical signal propagating in a first direction on the second optical link; a second control circuit to detect a presence of the first optical signal on the second optical link, and output a control signal in response to detecting the presence of the first optical signal; and a second optical source to supply a second optical signal on the second optical link, the second optical signal propagating in a second direction opposite the first direction, where the Raman pump is disabled in response to the control signal.

25 Claims, 28 Drawing Sheets

US 9,264,134 B2

AUTOMATIC LASER SHUTDOWN AND RECOVERY IN RESPONSE TO A LINK BREAK

BACKGROUND

Wavelength-division multiplexing (WDM) is a technique where light signals of different wavelengths are combined and simultaneously transmitted over a single optical fiber. Long distance WDM systems often use amplification to amplify the light signals.

One form of amplification is called Raman amplification. With Raman amplification, the amplification effect is achieved by an interaction between the signal and a pump laser within an optical fiber. One type of Raman amplification is commonly referred to as distributed Raman amplification. Distributed Raman amplification uses the transmission fiber as a gain medium by multiplexing a pump light wavelength with a signal wavelength. The pump light may be coupled into the transmission fiber in the same direction as the signal (co-propagating), in the opposite direction (counter-propagating) as the signal, or both.

SUMMARY

According to one implementation, a communication system may include a first optical source to supply a first optical signal to a first optical link, the first optical signal propagating in a first direction along the first optical link; a second optical source to supply a second optical signal to a second optical link, the second optical signal propagating in the first direction along the second optical link; a first control circuit to detect an absence of the first optical signal on the first optical link, and output a first signal in response to detecting the absence of the first optical signal; a third optical source to supply a third optical signal to the second optical link in response to the first signal, the third optical signal propagating in a second direction different than the first direction; a second control circuit to detect a presence of the third optical signal on the second optical link, and output a second signal in response to detecting the presence of the third optical signal; and a fourth optical source supplying a plurality of fourth optical signals to the second optical link, the plurality of fourth optical signals propagating along the second optical link in the second direction, where the second optical source is disabled in response to the second signal, and the second optical signal provides Raman gain to the fourth optical signal.

According to another implementation, a communication system may include a first control circuit to detect a break on a first optical link; a pilot laser to supply a first optical signal on a second optical link in response to detecting the break on the first optical link, the first optical signal propagating in a first direction on the second optical link; a second control circuit to detect a presence of the first optical signal on the second optical link, and output a control signal in response to detecting the presence of the first optical signal; and a Raman pump to supply a second optical signal on the second optical link, the second optical signal propagating in a second direction opposite the first direction, where the Raman pump is disabled in response to the control signal.

According to yet another implementation, a method may include supplying a first optical signal on a first optical link, the first optical signal propagating in a first direction on the first optical link; supplying a second optical signal on the first optical link, the second optical signal propagating in a second direction, that is opposite the first direction, on the first optical link; detecting an absence of the first optical signal on the first optical link; disabling the supplying of the second optical signal on the first optical link in response to detecting the absence of the first optical signal; supplying a third optical signal on a second optical link in response to detecting the absence of the first optical signal, the third optical signal propagating in the second direction on the second optical link; supplying a fourth optical signal on the second optical link, the fourth optical signal propagating in the first direction on the second optical link; detecting a presence of the third optical signal on the second optical link; and disabling the supplying of the fourth optical signal on the second optical link in response to detecting the presence of the third optical signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Implementations, described herein, may use counter-propagating and/or co-propagating Raman pumps to perform distributed Raman amplification. Raman pumps may output relatively high power levels (e.g., optical signals with wavelengths in the range of approximately 1420-1460 nanometers (nm)) compared to the power levels of other power-generating components. Due to the relatively high power levels of the Raman pumps, noise associated with the Raman pumps may make it difficult to detect link breaks using a simple power detection of the payload (that may include a number of multiplexed payload channels) and optical supervisory channel (OSC) signal powers. In the description to follow, the payload will be referred to as a "C-band payload" (e.g., optical signals with wavelengths in the range of approximately 1530-1565 nm), though the description is not limited to payload in the C-band. Also, some implementations may not use an OSC signal.

Accordingly, implementations, described herein, may perform fiber break detection using a dedicated pilot laser that transmits a pilot signal (e.g., an optical signal with a wavelength of approximately 1610 nm) that co-propagates with the payload and the OSC signal. The pilot laser may be modulated to produce one of two tone signals that facilitate in the link shutdown and recovery processes:

Remote Receive Fault (RRF) signal: may be used to notify the far end of the link about a fiber break in the opposite fiber span and to indicate to the far end should turn off (e.g., disable) its pumps.

Normal (NRM) signal: may be used to notify the far end of the link that no fiber break exists in the opposite fiber span and to indicate that the far end should turn on (e.g., enable) its pumps.

These signals may be designed for ease of detection in high loss links. These signals may be generated at the near end of the link and may be detected and used at the far end of the link.

Exemplary System

Figure 1:
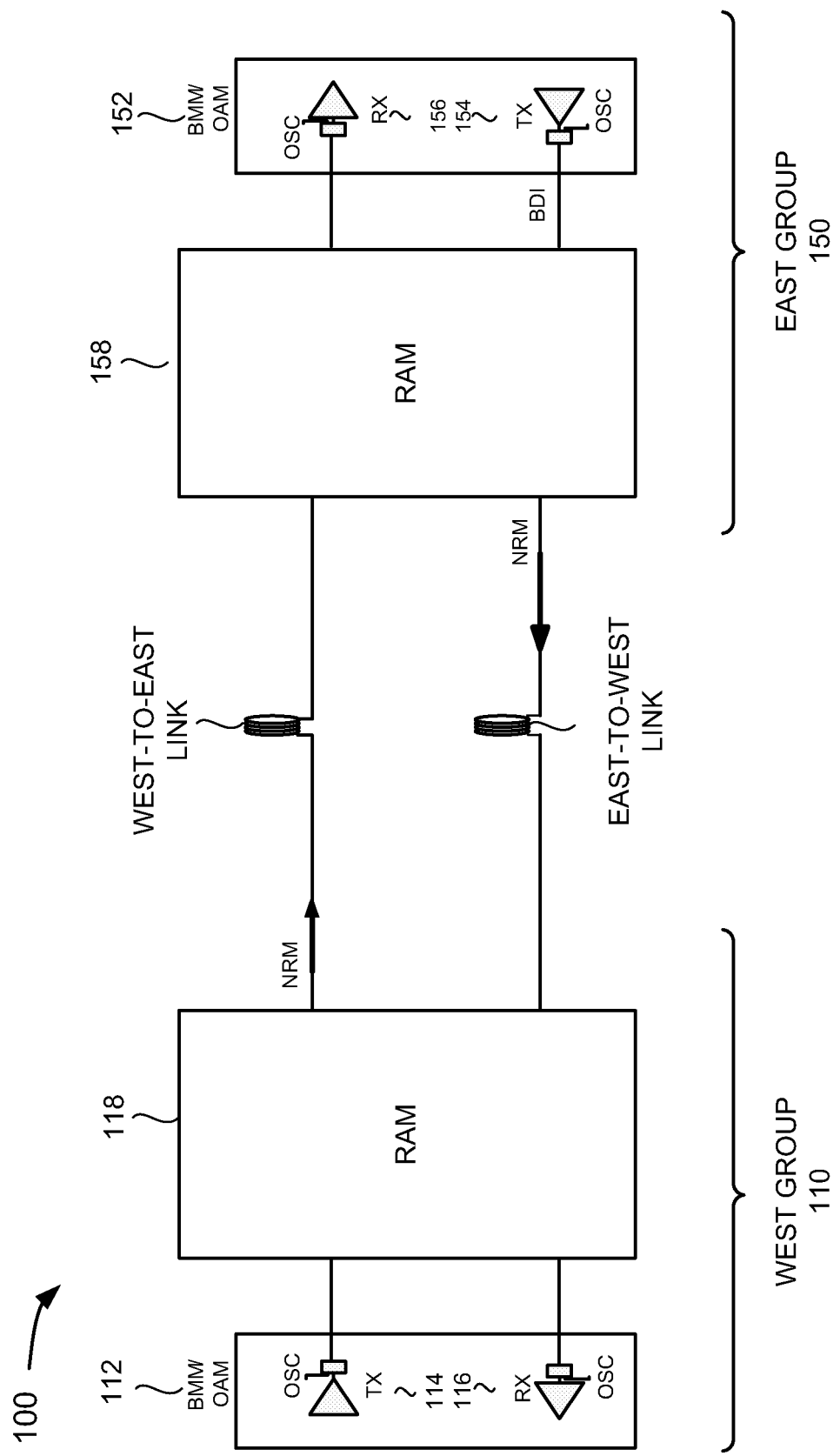
FIG. 1 is a diagram of an exemplary system in which systems and/or methods described herein may be implemented.

FIG. 1 is a diagram of an exemplary system 100 in which systems and/or methods described herein may be implemented. While FIG. 1 shows a particular number and arrangement of components, system 100 may include additional, fewer, different, or differently arranged components than those illustrated in FIG. 1. As shown in FIG. 1, system 100 may include a west group of components (hereinafter referred to as "group 110") and an east group of components (hereinafter referred to as "group 150") connected by a west-to-east link and an east-to-west link. The west-to-east link and the east-to-west link may include optical fibers. The term "group," as used herein, may refer to a collection of components that may be located at a same end of a fiber.

West group 110 may include a band multiplexer module (BMM)/optical amplifier module (OAM) (hereinafter referred to as BMM/OAM) 112 and Raman amplifier module (RAM) 118. BMM/OAM 112 may include a transmitter (TX) module 114 and a receiver (RX) module 116. Transmitter module 114 may generally be referred to as an optical source. In one implementation, transmitter module 114 may include an amplifier (e.g., an Erbium-doped fiber amplifier (EDFA)) that may output a C-band payload (e.g., optical signals with wavelengths in the range of approximately 1530-1565 nm), and an OSC source that may output an OSC signal (e.g., optical signal with wavelengths in the range of approximately 1505-1520 nm). Transmitter module 114 may also include a wavelength-division multiplexer (WDM) that may optically combine the C-band payload and the OSC signal for output from BMM/OAM 112. Receiver module 116 may generally be referred to as an optical signal detector. In one implementation, receiver module 116 may include an amplifier (e.g., an EDFA) that may receive a C-band payload, and an OSC detector that may receive an OSC signal. Receiver module 116 may also include a wavelength-division demultiplexer (also referred to herein as a WDM) that may receive a combined C-band payload and OSC signal at an input of BMM/OAM 112 and optically separate the C-band payload and the OSC signal for presentation to the amplifier and OSC detector, respectively.

Figure 2:
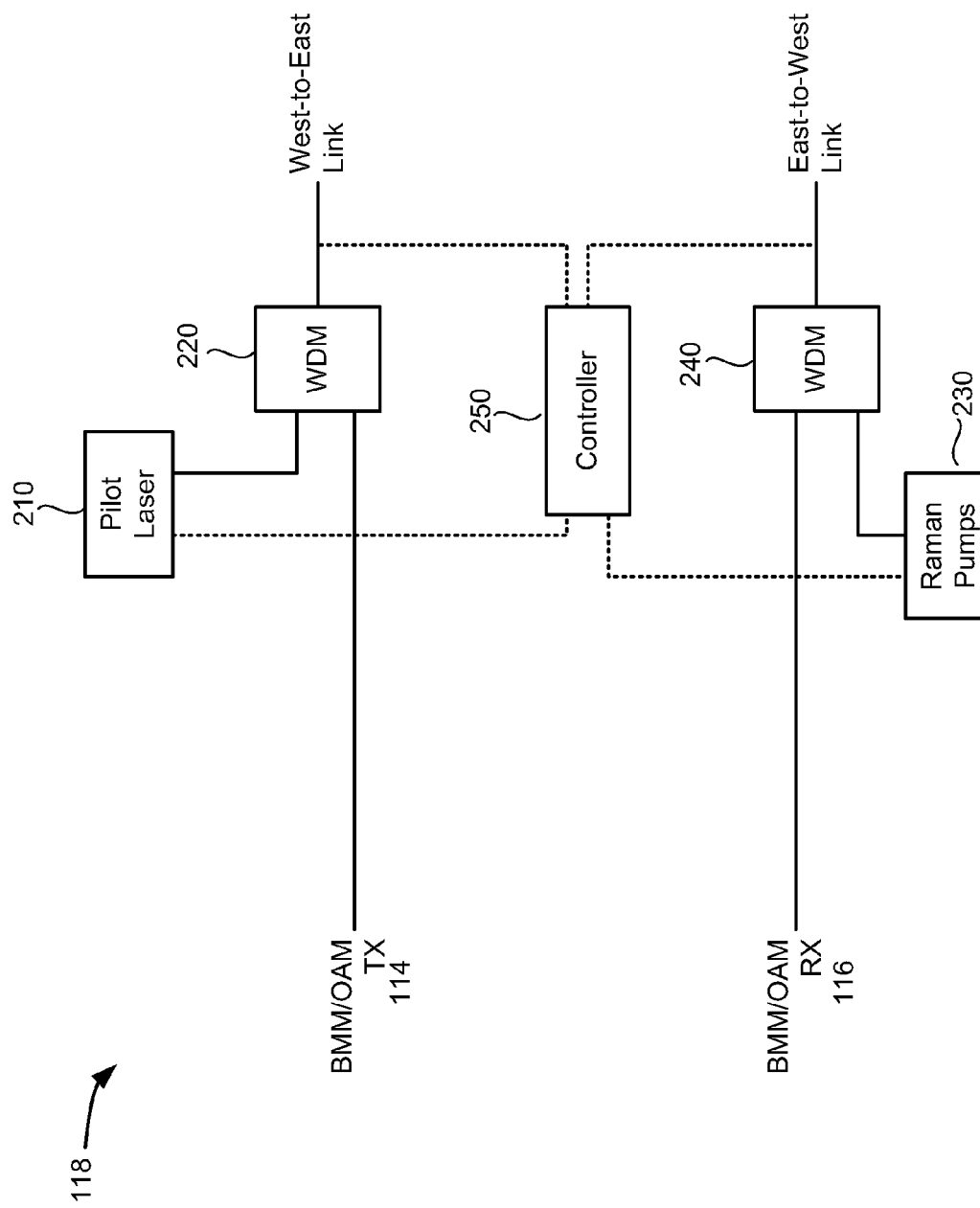
FIG. 2 is a diagram of exemplary components of a Raman amplifier module (RAM) shown in FIG. 1.

RAM 118 may include components for performing Raman amplification. FIG. 2 is a diagram of exemplary components of RAM 118 according to one implementation. While FIG. 2 shows a particular number and arrangement of components, RAM 118 may include additional, fewer, different, or differently arranged components than are illustrated in FIG. 2.

As shown in FIG. 2, RAM 118 may include a pilot laser 210, a WDM 220, Raman pumps 230, another WDM 240, and a controller 250. Pilot laser 210 may generally be referred to as an optical source. In one implementation, pilot laser 2120 may include a laser that generates, for example, a 1610 nm pilot signal that may be transmitted to co-propagate with the combined C-band payload and OSC signal. In another implementation, pilot laser 210 may generate a light signal of another wavelength that may be selected so as not to interfere with the C-band payload or OSC signal and that may be detected on the far end of the link in the presence of noise from the Raman pumps (on the far end of the link). Pilot laser 210 may modulate the pilot signal to produce one of two tone signals that facilitate in link shutdown and recovery processes. In one implementation, pilot laser 210 may modulate the pilot signal to produce a remove receive fault (RRF) signal or a normal (NRM) signal. The RRF signal may be used to notify the RAM at the far end of the link (e.g., west-to-east link) that a fiber break has been detected in the opposite link (i.e., east-to-west link). The NRM signal may be used to notify the RAM at the far end of the link that no fiber break has been detected in the opposite link. WDM 220 may include an optical multiplexer that may receive the pilot signal from pilot laser 210 and the combined C-band payload and OSC signal from transmitter module 114 (FIG. 1) and optically combine them for output on the west-to-east link.

Raman pumps 230 may generally be referred to as an optical source that provides distributed Raman amplification. In one implementation, Raman pumps 230 may include one or more pump lasers that produce pump power (also called pump light) (e.g., optical signals with in the range of approximately 1420-1460 nm) that may be transmitted so as to counter-propagate with the C-band payload, OSC signal, and pilot signal. WDM 240 may include an optical demultiplexer that may receive the combined C-band payload, OSC signal, and pilot signal from the east-to-west link and optically separate the C-band payload and OSC signal for output to receiver module 116 (FIG. 1). WDM 240 may also receive the pump power from Raman pumps 230 and output the pump power on the east-to-west link.

Controller 250 may include a control circuit, such as a field programmable gate array (FPGA), or another type of hardware, that may detect the pilot signals transmitted on west-to-east link and/or east-to-west link. Controller 250 may control the operation of pilot laser 210 to turn on or off and/or to produce the RRF signal or the NRM signal. Controller 250 may also control the operation of Raman pumps 230 to turn on or off.

Figure 3:
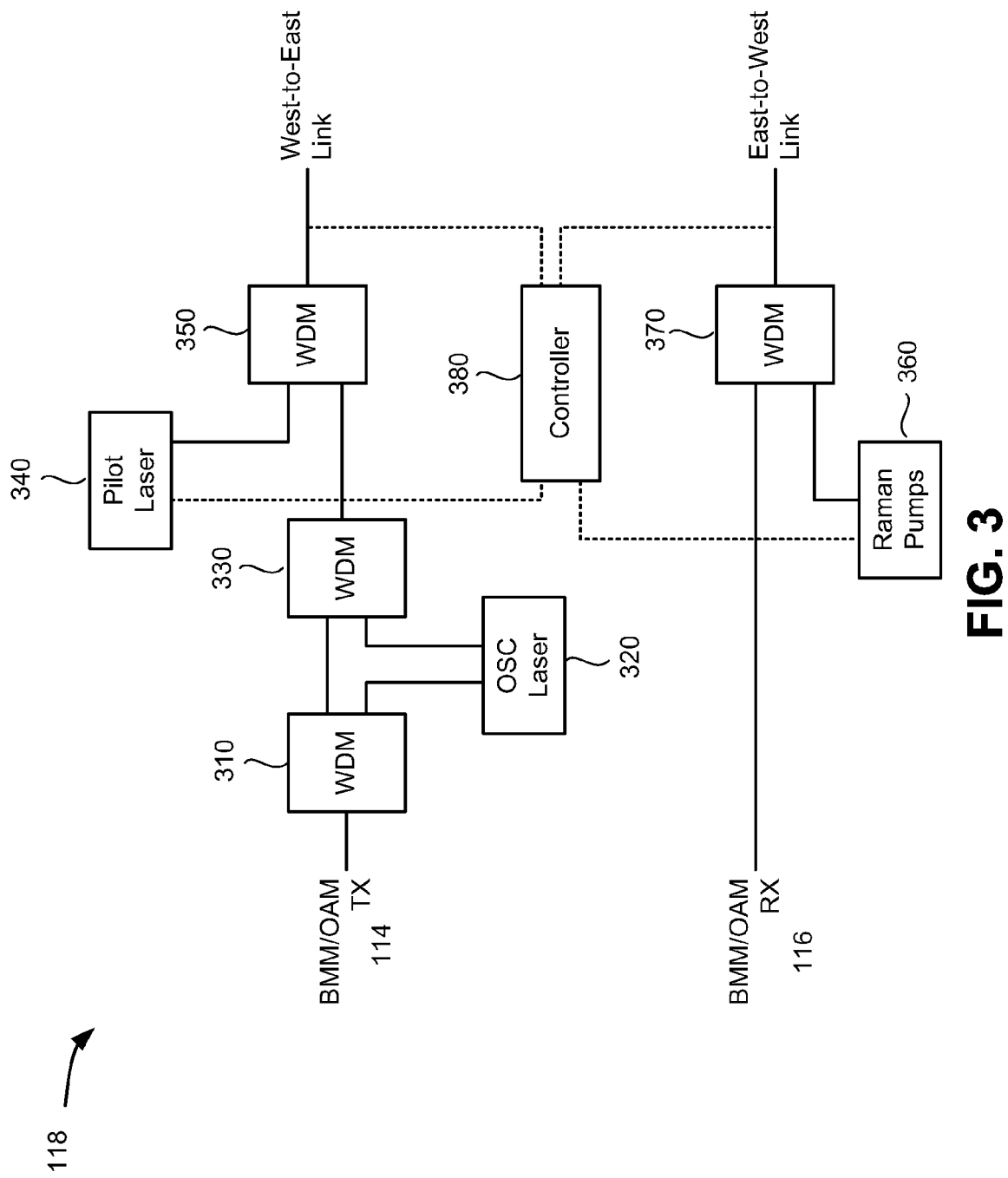
FIG. 3 is another diagram of exemplary components of a RAM shown in FIG. 1.

FIG. 3 is another diagram of exemplary components of RAM 118 according to another implementation. While FIG. 3 shows a particular number and arrangement of components, RAM 118 may include additional, fewer, different, or differently arranged components than are illustrated in FIG. 3.

As shown in FIG. 3, RAM 118 may include a WDM 310, an OSC laser 320, a WDM 330, a pilot laser 340, a WDM 350, Raman pumps 360, a WDM 370, and a controller 380. WDM 310 may include an optical demultiplexer that may receive the combined C-band payload and OSC signal from transmitter module 114 (FIG. 1) and optically separate the C-band payload from the OSC signal. WDM 310 may provide the C-band payload to WDM 330 and the OSC signal to OSC laser 320. OSC laser 320 may generally be referred to as an optical source. In one implementation, OSC laser 320 may include a regeneration laser that may receive the OSC signal and regenerate the OSC signal for output to WDM 330. WDM 330 may include an optical multiplexer that may receive the C-band payload and the regenerated OSC signal, optically combine them, and output a combined C-band payload and OSC signal to WDM 350.

Pilot laser 340 may generally be referred to as an optical source. In one implementation, pilot laser 340 may include a laser that generates, for example, a 1610 nm pilot signal that may be transmitted to co-propagate with the combined C-band payload and OSC signal. In another implementation, pilot laser 210 may generate a light signal of another wavelength that may be selected so as not to interfere with the C-band payload or OSC signal and that may be detected on the far end of the link in the presence of noise from the Raman pumps (on the far end of the link). Pilot laser 340 may modulate the pilot signal to produce one of two tone signals that facilitate in link shutdown and restoration processes. In one implementation, pilot laser 340 may modulate the pilot signal to produce a RRF signal or a NRM signal. As explained above, the RRF signal may be used to notify the RAM at the far end of the link (e.g., west-to-east link) that a fiber break has been detected in the opposite link (i.e., east-to-west link). As also explained above, the NRM signal may be used to notify the RAM at the far end of the link that no fiber break has been detected in the opposite link. WDM 350 may include an optical multiplexer that may receive the pilot signal from pilot laser 340 and the combined C-band payload and OSC signal from WDM 330 and optically combine them for output on the west-to-east link.

Raman pumps 360 may generally be referred to as an optical source that provides distributed Raman amplification. In one implementation, Raman pumps 360 may include one or more pump lasers that produce pump power (also called pump light) (e.g., optical signals with in the range of approximately 1420-1460 nm) that may be transmitted so as to counter-propagate with the C-band payload, OSC signal, and pilot signal. WDM 370 may include an optical demultiplexer that may receive the combined C-band payload, OSC signal, and pilot signal from the east-to-west link and optically separate the C-band payload and OSC signal for output to receiver module 116 (FIG. 1). WDM 370 may also receive the pump power from Raman pumps 360 and output the pump power on the east-to-west link.

Controller 380 may include a control circuit, such as a FPGA, or another type of hardware, that may detect the pilot signals transmitted on west-to-east link and/or east-to-west link. Controller 380 may control the operation of pilot laser 340 to turn on or off and/or to produce the RRF signal or the NRM signal. Controller 380 may also control the operation of Raman pumps 360 to turn on or off. Controller 380 may further control the operation of OSC laser 320 to turn on or off (not shown in FIG. 3).

Returning to FIG. 1, east group 150 may include a BMM/OAM 152 and Raman amplifier module (RAM) 158. BMM/OAM 152 may include a transmitter (TX) module 154 and a receiver (RX) module 156. Transmitter module 154 and receiver module 156 may be similar in construction and operation to transmitter module 114 and receiver module 116 described with regard to west group 110. RAM 158 may be similar in construction and operation to RAM 118 described with regard to west group 110.

Link Break on West-to-East Link

During normal operation (prior to the link break) (e.g., FIG. 1), west group 110 and east group 150 may exchange signals on the west-to-east link and the east-to-west link. For example, west group 110 may transmit signals to east group 150 on the west-to-east link, and east group 150 may transmit signals to west group 110 on the east-to-west link. During this time, pilot laser 210/340 may be turned on and may output a pilot NRM signal, and Raman pumps 230/360 may be turned on and may output pump power.

Figure 4:
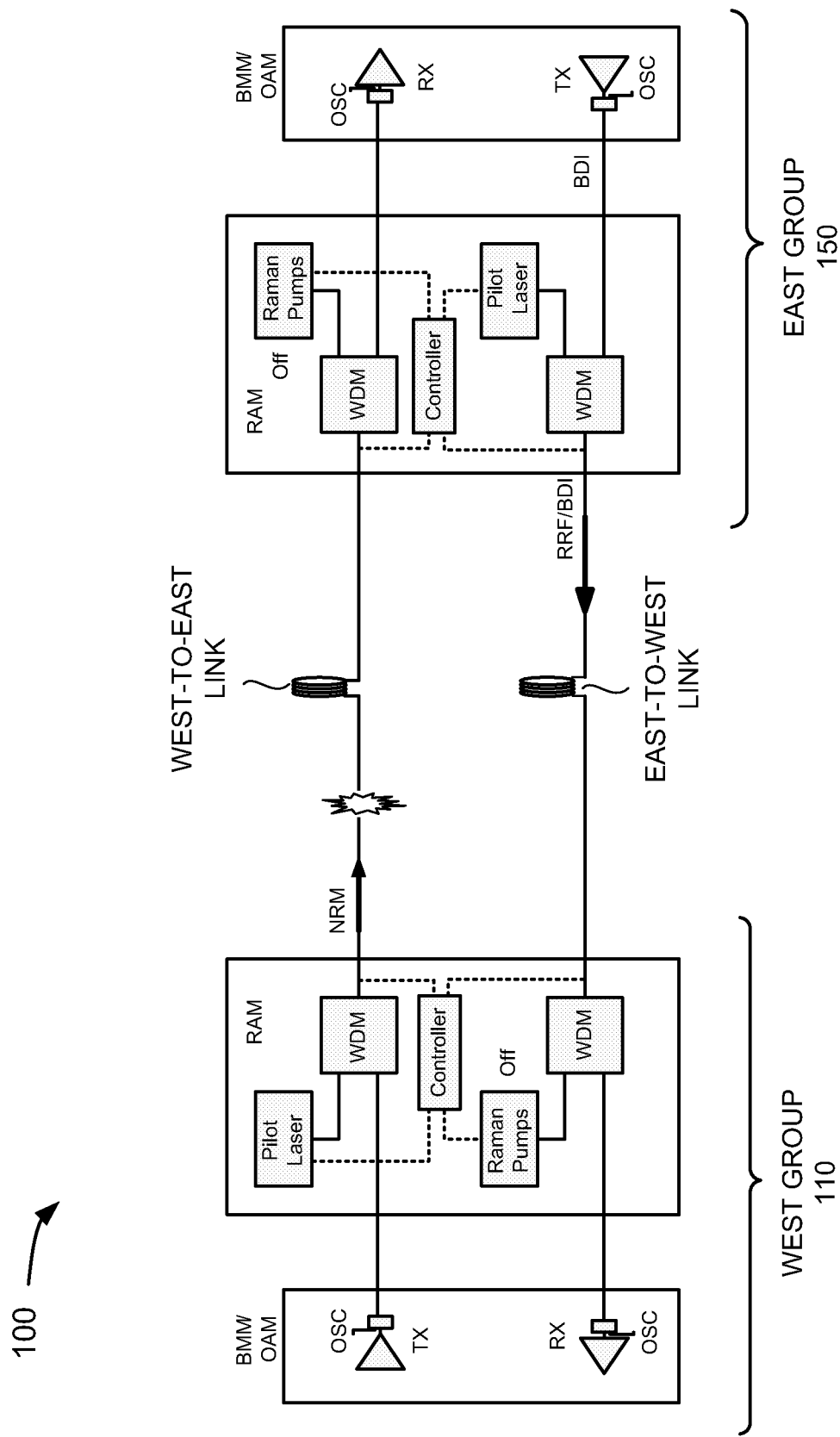
FIG. 4 is a diagram of the exemplary system of FIG. 1 in a situation where a link break occurs on a west-to-east link.
Figure 5:
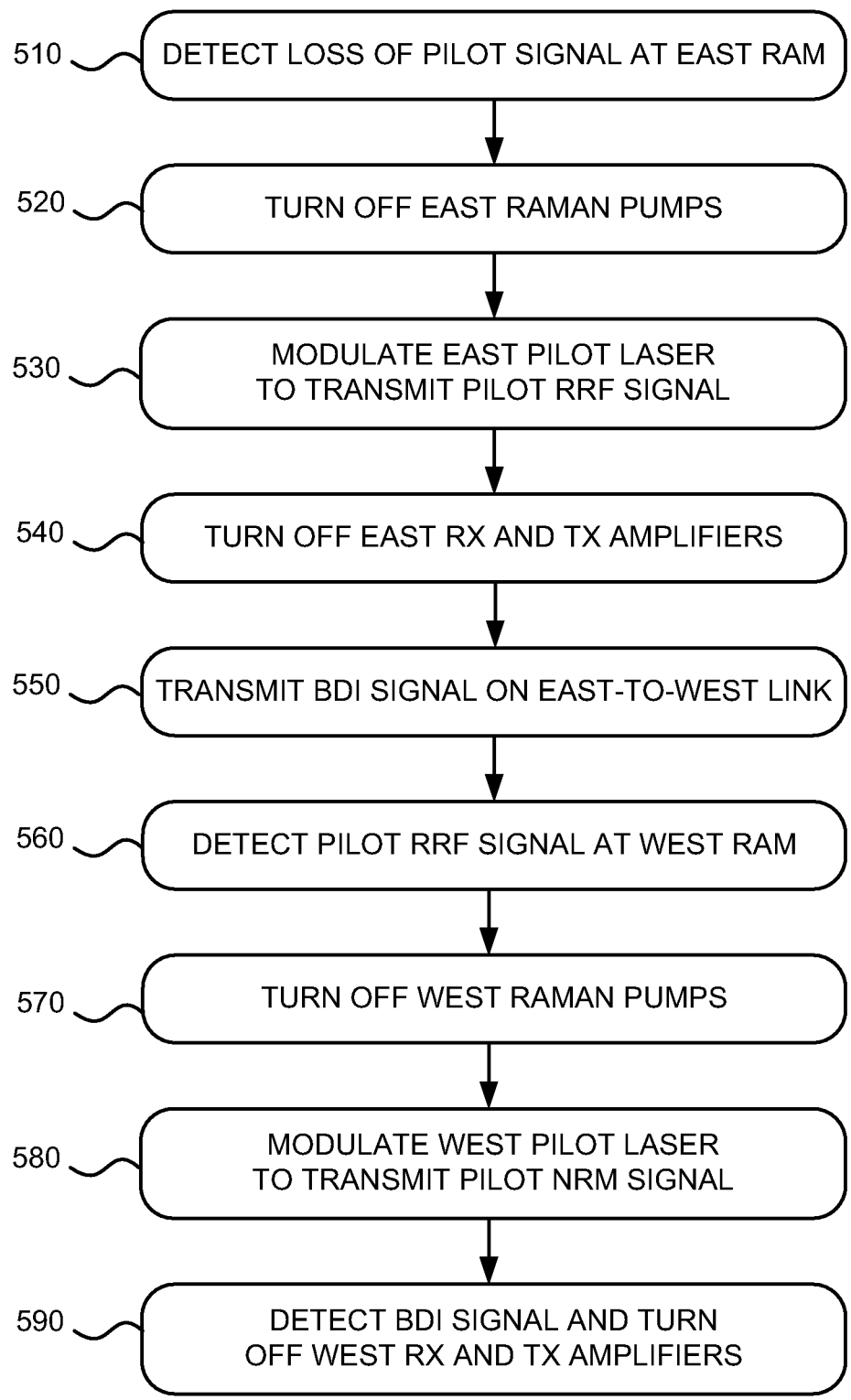
FIG. 5 is a flowchart of an exemplary process for shutting down components in response to the link break of FIG. 4.

Now assume that a link break occurs on the west-to-east link. FIG. 4 is a diagram of exemplary system 100 in the situation where a link break occurs on the west-to-east link. FIG. 5 is a flowchart of an exemplary process for shutting down components in response to the link break. In the description to follow, reference will be made to certain components of west group 110 and east group 150. These components will be referred to as west and east components, respectively. For example, the RAM in west group 110 will be referred to as the west RAM, and the RAM in east group 150 will be referred to as the east RAM.

The loss of the pilot signal may be detected at the east RAM (block 510). For example, due to the link break, the pilot signal outputted by the west RAM cannot reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east Raman pumps may be turned off (block 520). For example, when the east controller detects the loss of the pilot signal, the east controller may send a signal for the east Raman pumps to turn off. The east Raman pumps may turn off in response to the signal from the east controller, as shown in FIG. 4.

The east pilot laser may be modulated to transmit the RRF signal (block 530). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 4.

The amplifiers of the east receiver and transmitter modules may be turned off (block 540). The east receiver module may detect the loss of the C-band payload and/or OSC signal, as a result of the link break, and may turn off its amplifier. When the east receiver module turns off its amplifier, it may trigger the east transmitter module to turn off its amplifier. The east transmitter module may then turn off its amplifier.

A backward defect indication (BDI) signal may be transmitted on the east-to-west link (block 550). For example, when the east transmitter module turns off its amplifier, the east transmitter module may trigger the east OSC source, associated with the east transmitter module, to generate the BDI signal and output the BDI signal to the east WDM. The east WDM may optically combine the BDI signal with the pilot RRF signal and output the combined BDI signal and RRF signal on the east-to-west link.

The pilot RRF signal may be detected at the west RAM (block 560). For example, the west controller (within the west RAM) may monitor the signals transmitted on the east-to-west link to detect the presence of the pilot signal and to determine whether the pilot signal includes the RRF signal or the NRM signal. In this case, the west controller may detect the presence of the RRF signal.

The west Raman pumps may be turned off (block 570). For example, when the west controller detects the pilot RRF signal from the east RAM, the west controller may send a signal for the west Raman pumps to turn off. The west Raman pumps may turn off in response to the signal from the west controller, as shown in FIG. 4.

The west pilot laser may be modulated to transmit the NRM signal (block 580). For example, when the west controller detects the pilot RRF signal from the east RAM, the west controller may send a signal to the west pilot laser to modulate with the NRM signal. The west pilot laser may modulate with the NRM signal in response to the signal from the west controller, as shown in FIG. 4. The NRM signal may indicate to the east RAM that the east-to-west link is operable.

The BDI signal may be detected and the amplifiers of the west receiver and transmitter modules may be turned off (block 590). For example, the west receiver module may detect the BDI signal from the east transmitter module, and turn off its amplifier. When the west receiver module turns off its amplifier, it triggers the west transmitter module to turn off its amplifier. The west transmitter module may then turn off its amplifier. Both the west-to-east and the east-to-west links are now completely safe. In other words, a technician may safely repair the link break.

Figure 6:
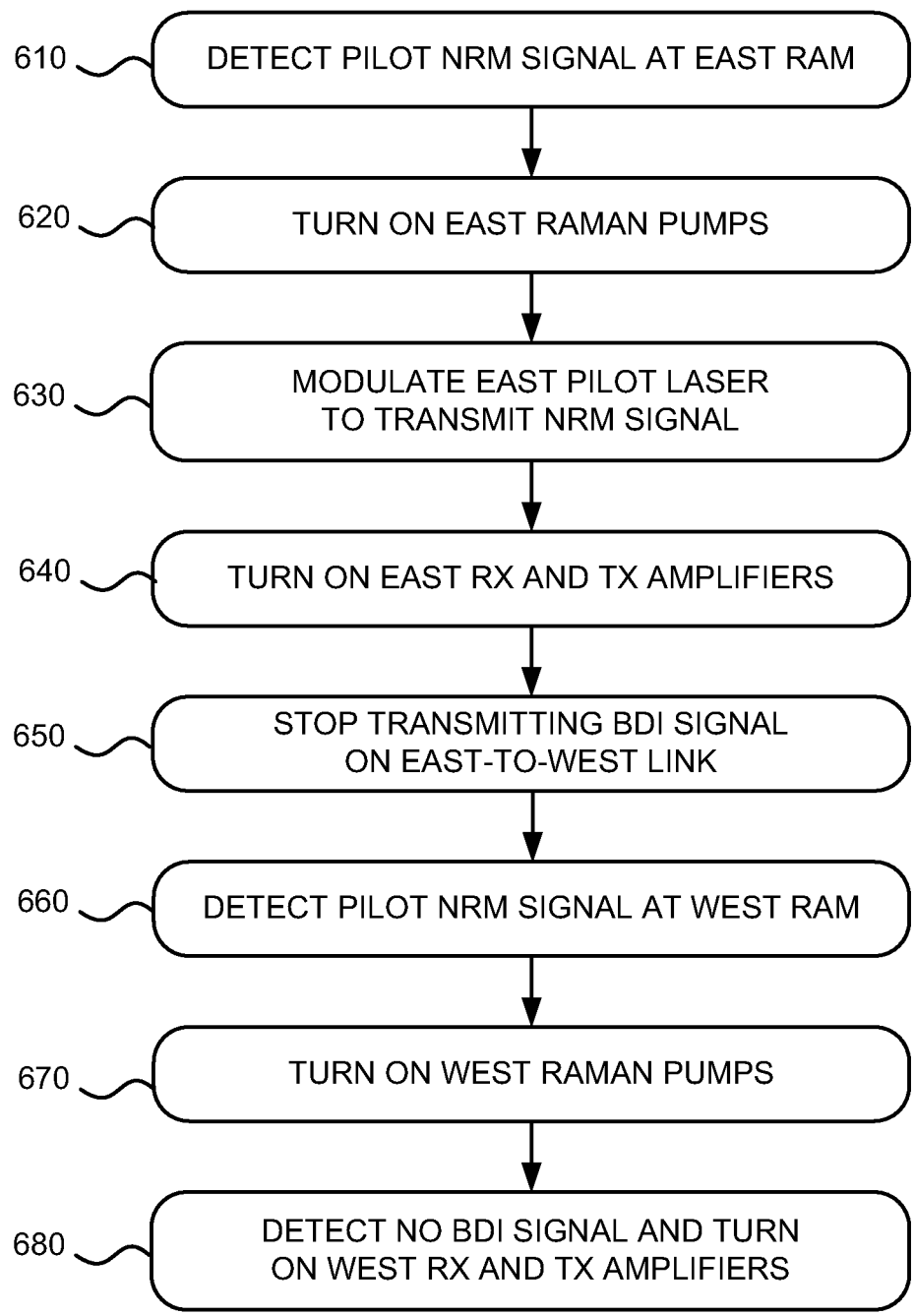
FIG. 6 is a flowchart of an exemplary process for restoring components in response to repair of the link break of FIG. 4.

FIG. 6 is a flowchart of an exemplary process for restoring components in response to repair of the link break. The pilot NRM signal may be detected at the east RAM (block 610). For example, now that the link break has been repaired, the pilot NRM signal outputted by the west RAM can reach the east RAM. The east controller (within the east RAM) may monitor the presence of the pilot signal and detect the NRM signal.

The east Raman pumps may be turned on (block 620). For example, when the east controller detects the pilot NRM signal, the east controller may send a signal for the east Raman pumps to turn on. The east Raman pumps may turn on in response to the signal from the east controller.

The east pilot laser may be modulated to transmit the NRM signal (block 630). For example, when the east controller detects the pilot NRM signal, the east controller may send a signal to the east pilot laser to modulate with the NRM signal. The east pilot laser may modulate with the NRM signal in response to the signal from the east controller.

The amplifiers of the east receiver and transmitter modules may be turned on (block 640). The east receiver module may detect the C-band payload and/or OSC signal, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 650). For example, when the east transmitter module turns on its amplifier, the east transmitter module may trigger the east OSC source, associated with the east transmitter module, to stop generating the BDI signal.

The pilot NRM signal may be detected at the west RAM (block 660). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west Raman pumps may be turned on (block 670). For example, when the west controller detects the pilot NRM signal from the east RAM, the west controller may send a signal to the west Raman pumps to turn on. The west Raman pumps may turn on in response to the signal from the west controller.

No BDI signal may be detected on the east-to-west link, and the amplifiers of the west receiver and transmitter modules may be turned on (block 590). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 100 may return to normal operation.

Link Breaks on Both West-to-East Link and East-to-West Link

During normal operation (prior to the link break) (e.g., FIG. 1), west group 110 and east group 150 may exchange signals on the west-to-east link and the east-to-west link. For example, west group 110 may transmit signals to east group 150 on the west-to-east link, and east group 150 may transmit signals to west group 110 on the east-to-west link. During this time, pilot laser 210/340 may be turned on and may output a pilot NRM signal, and Raman pumps 230/360 may be turned on and may output pump power.

Figure 7:
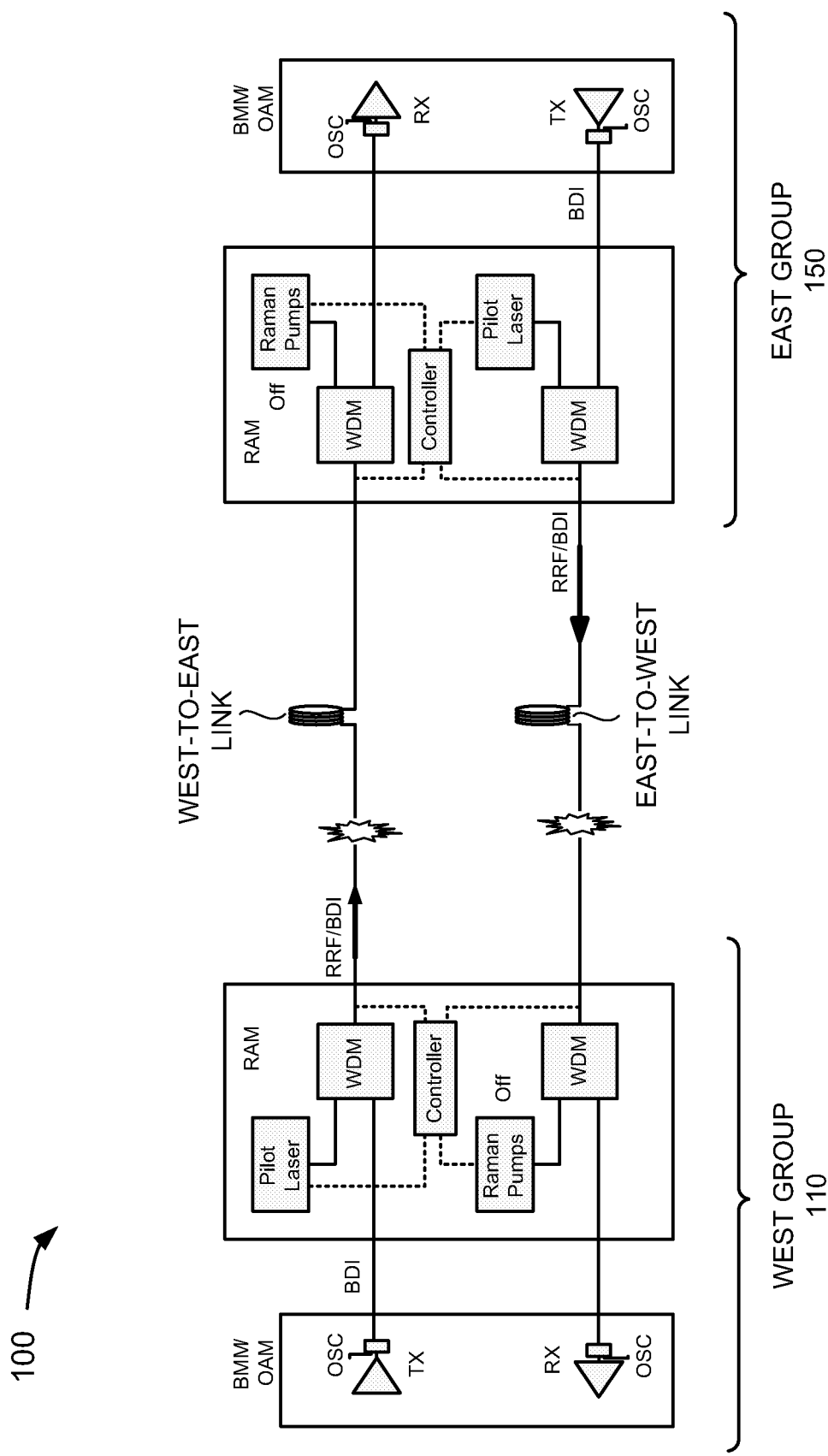
FIG. 7 is a diagram of the exemplary system of FIG. 1 in a situation where link breaks occur on both a west-to-east link and an east-to-west link.
Figure 8:
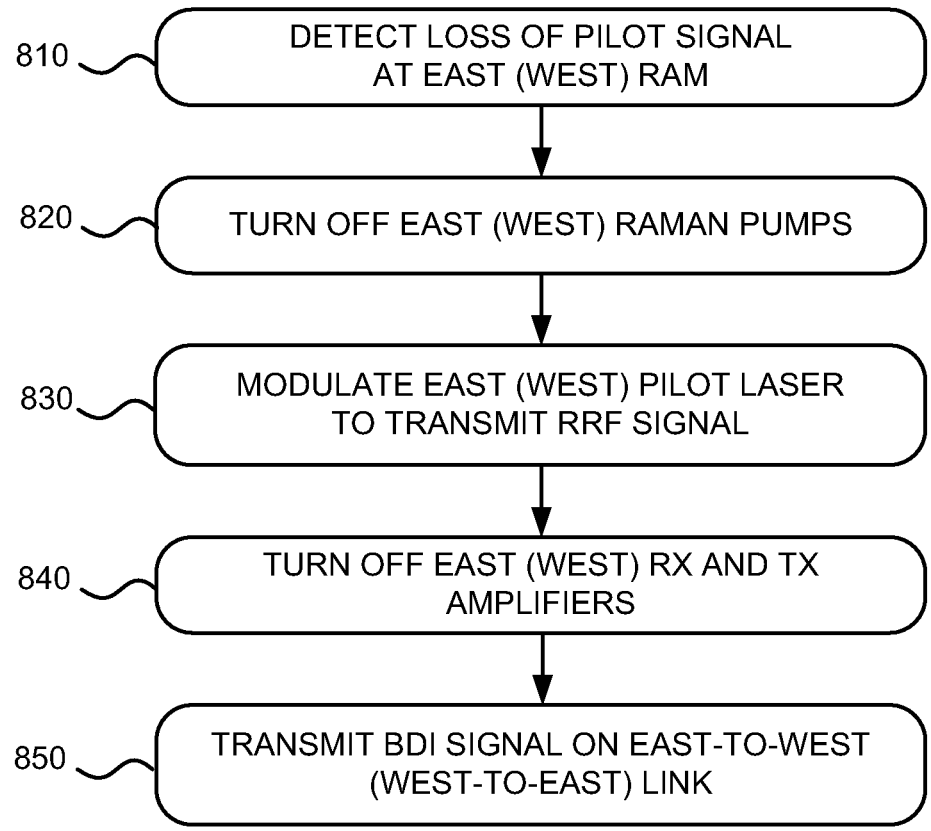
FIG. 8 is a flowchart of an exemplary process for shutting down components in response to the link breaks of FIG. 7.

Now assume that link breaks occur on both the west-to-east link and the east-to-west link. FIG. 7 is a diagram of exemplary system 100 in the situation where link breaks occur on both the west-to-east link and the east-to-west link. FIG. 8 is a flowchart of an exemplary process for shutting down components in response to the link breaks. In the description to follow, reference will be made to certain components of west group 110 and east group 150. These components will be referred to as west and east components, respectively. For example, the RAM in west group 110 will be referred to as the west RAM, and the RAM in east group 150 will be referred to as the east RAM.

The loss of the pilot signal may be detected at the east RAM (block 810). For example, due to the link break, the pilot signal outputted by the west RAM cannot reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east Raman pumps may be turned off (block 820). For example, when the east controller detects the loss of the pilot signal, the east controller may send a signal to the east Raman pumps to turn off. The east Raman pumps may turn off in response to the signal from the east controller, as shown in FIG. 7.

The east pilot laser may be modulated to transmit the RRF signal (block 830). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 7.

The amplifiers of the east receiver and transmitter modules may be turned off (block 840). The east receiver module may detect the loss of the C-band payload and/or OSC signal, as a result of the link break, and turn off its amplifier. When the east receiver module turns off its amplifier, it triggers the east transmitter module to turn off its amplifier. The east transmitter module may then turn off its amplifier.

A BDI signal may be transmitted on the east-to-west link (block 850). For example, the east OSC source, associated with the east transmitter module, may generate the BDI signal and output the BDI signal to the east WDM. The east WDM may optically combine the BDI signal with the pilot RRF signal and output the combined BDI signal and RRF signal on the east-to-west link. The combined BDI signal and RRF signal will not arrive at west group 110 due to the link break on the east-to-west link.

Simultaneously, or substantially simultaneously, blocks 810-850 may be performed by west group 110. As a result, both the west-to-east and the east-to-west links are now completely safe. In other words, a technician may safely repair the link breaks.

Figure 9:
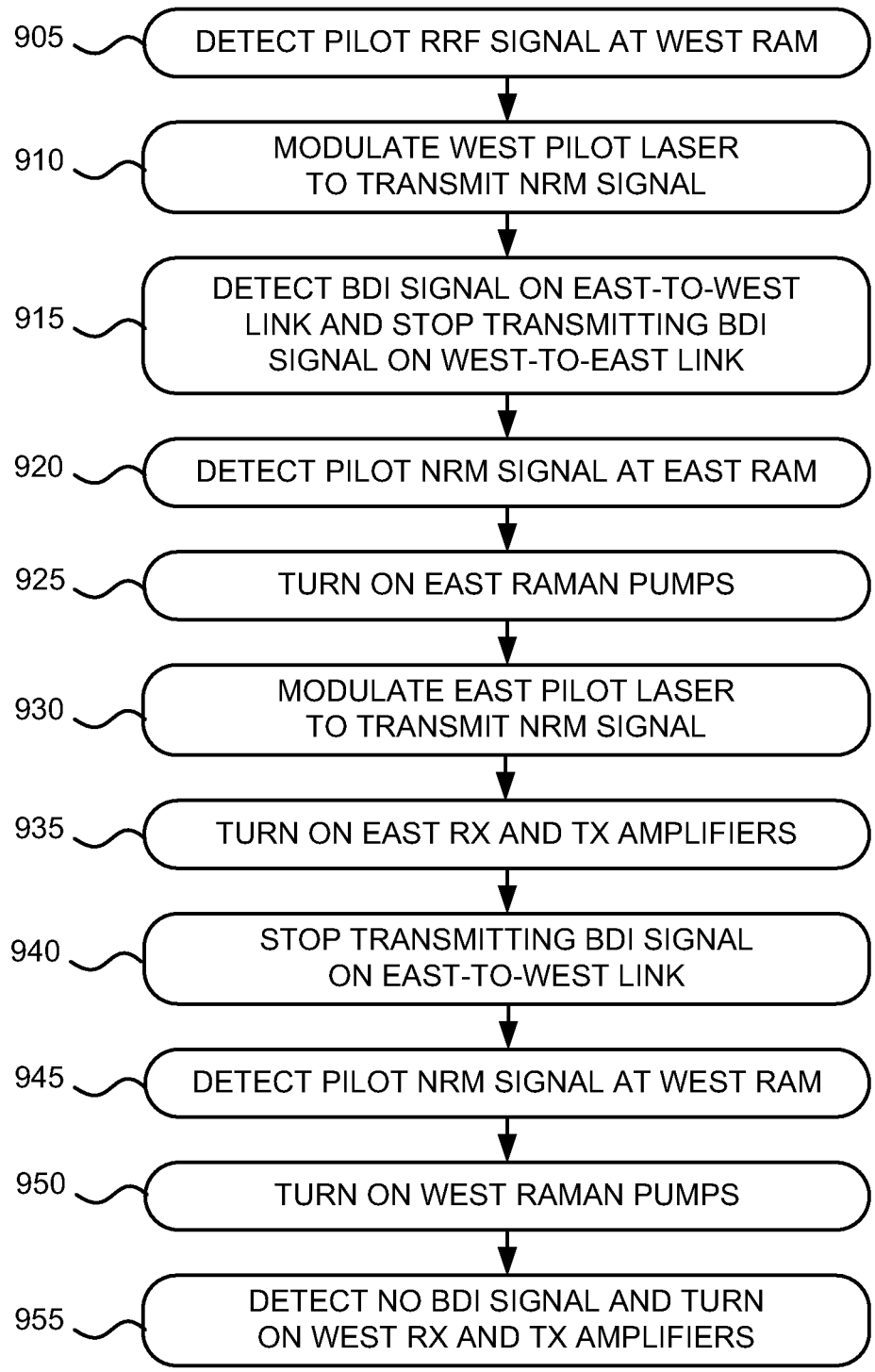
FIG. 9 is a flowchart of an exemplary process for restoring components in response to repair of the link breaks of FIG. 7.

FIG. 9 is a flowchart of an exemplary process for restoring components in response to repair of the link breaks. Assume, for example, that the east-to-west link is repaired first. The pilot RRF signal may be detected at the west RAM (block 905). For example, now that the link break on the east-to-west link has been repaired, the pilot RRF signal outputted by the east RAM can reach the west RAM. The west controller (within the west RAM) may monitor the presence of the pilot signal and detect the RRF signal. In response to the pilot RRF signal, the west controller may keep the west Raman pumps turned off.

The west pilot laser may be modulated to transmit the NRM signal (block 910). For example, the west controller may send a signal to the west pilot laser to modulate with the NRM signal. The west pilot laser may modulate with the NRM signal in response to the signal from the west controller.

The BDI signal may be detected on the east-to-west link and the transmitting of the BDI signal on the west-to-east link may be stopped (block 915). For example, the west receiver module may detect the restoration of the OSC power and detect the BDI signal sent from east group 150. The west receiver module may keep its amplifier turned off and signal the west transmitter module to stop transmitting the BDI signal.

When the west-to-east link is repaired, the pilot NRM signal may be detected at the east RAM (block 920). For example, now that the link break on the west-to-east link has been repaired, the pilot NRM signal outputted by the west RAM can reach the east RAM. The east controller (within the east RAM) may monitor the presence of the pilot signal and detect the NRM signal.

The east Raman pumps may be turned on (block 925). For example, when the east controller detects the pilot NRM signal, the east controller may send a signal to the east Raman pumps to turn on. The east Raman pumps may turn on in response to the signal from the east controller.

The east pilot laser may be modulated to transmit the NRM signal (block 930). For example, when the east controller detects the pilot NRM signal, the east controller may send a signal to the east pilot laser to modulate with the NRM signal. The east pilot laser may modulate with the NRM signal in response to the signal from the east controller.

The amplifiers of the east receiver and transmitter modules may be turned on (block 935). The east receiver module may detect that the OSC power is restored on the west-to-east link, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 940). For example, when the east transmitter module turns on its amplifier, the east transmitter module may trigger the east OSC source, associated with the east transmitter module, to stop generating the BDI signal.

The pilot NRM signal may be detected at the west RAM (block 945). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west Raman pumps may be turned on (block 950). For example, when the west controller detects the pilot NRM signal from the east RAM, the west controller may send a signal to the west Raman pumps to turn on. The west Raman pumps may turn on in response to the signal from the west controller.

No BDI signal may be detected on the east-to-west link, and the amplifiers of the west receiver and transmitter modules may be turned on (block 955). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 100 may return to normal operation.

Link Break on Local Transmit Link

During normal operation (prior to the link break) (e.g., FIG. 1), west group 110 and east group 150 may exchange signals on the west-to-east link and the east-to-west link. For example, west group 110 may transmit signals to east group 150 on the west-to-east link, and east group 150 may transmit signals to west group 110 on the east-to-west link. During this time, pilot laser 210/340 may be turned on and may output a pilot NRM signal, and Raman pumps 230/360 may be turned on and may output pump power.

Figure 10:
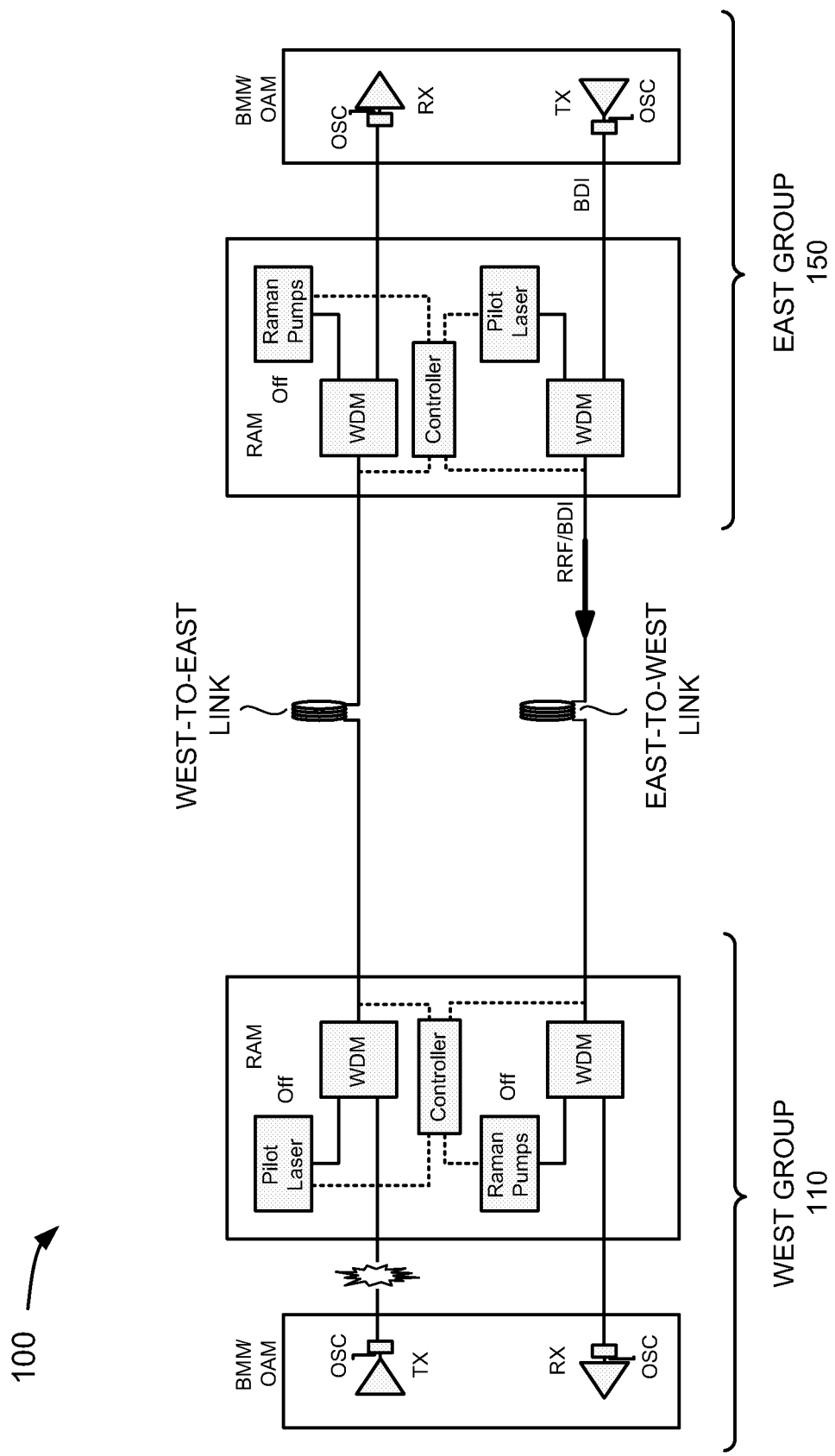
FIG. 10 is a diagram of the exemplary system of FIG. 1 in a situation where a link break occurs on a local transmit link.
Figure 11:
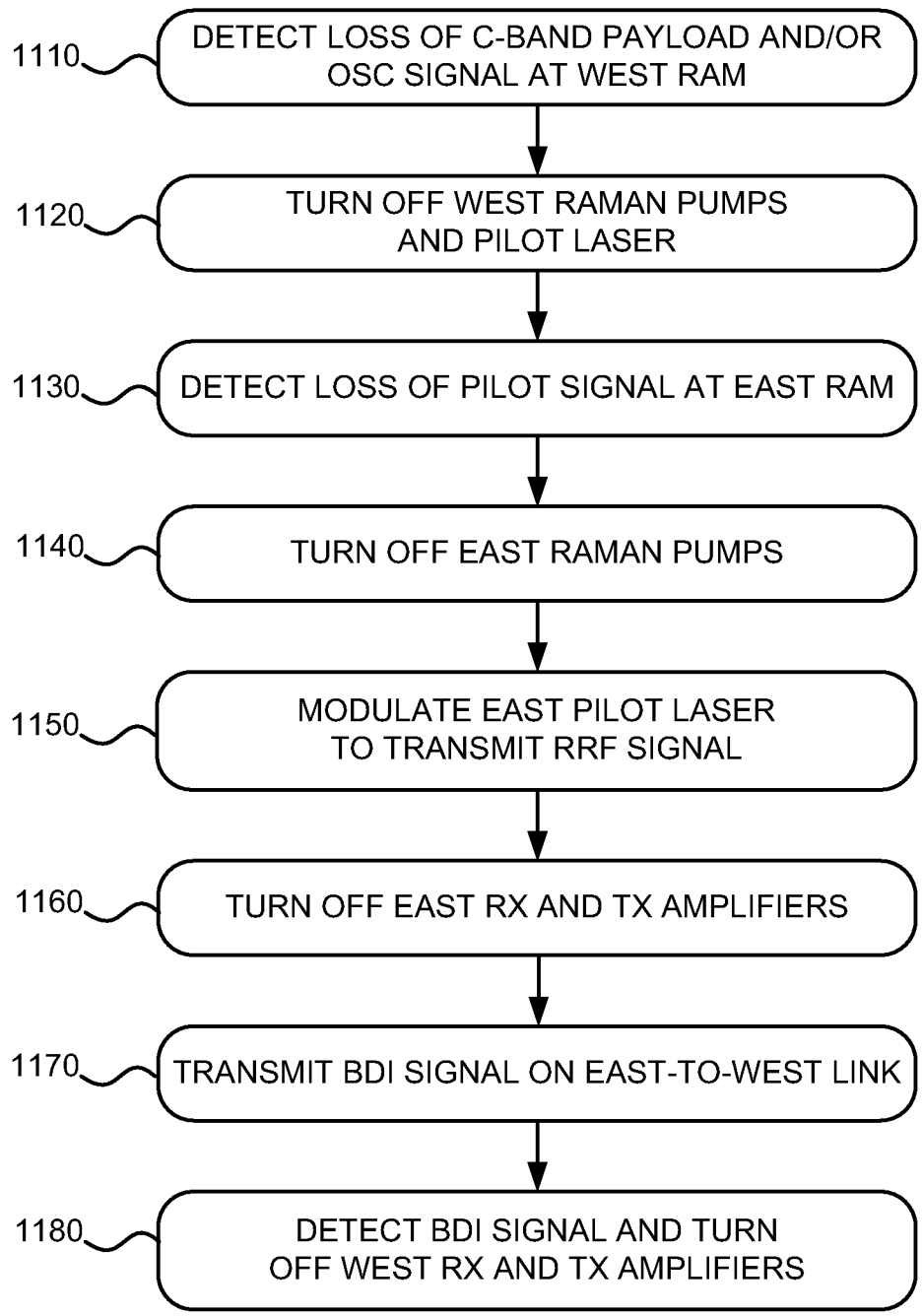
FIG. 11 is a flowchart of an exemplary process for shutting down components in response to the link break of FIG. 10.

Now assume that a link break occurs on the local transmit link located between the west BMM/OAM and the west RAM. FIG. 10 is a diagram of exemplary system 100 in the situation where a link break occurs on the local transmit link. FIG. 11 is a flowchart of an exemplary process for shutting down components in response to the link break. In the description to follow, reference will be made to certain components of west group 110 and east group 150. These components will be referred to as west and east components, respectively. For example, the RAM in west group 110 will be referred to as the west RAM, and the RAM in east group 150 will be referred to as the east RAM.

A loss of C-band payload and/or OSC signal may be detected at the west RAM (block 1110). For example, due to the link break, the C-band payload and OSC signal outputted by the west BMM/OAM cannot reach the west RAM. The west controller (within the west RAM) may detect the absence of the C-band payload and/or OSC signal.

The west Raman pumps and the west pilot laser may be turned off (block 1120). For example, when the west controller detects the loss of the C-band payload and/or OSC signal, the west controller may send signals to the west Raman pumps and the west pilot laser to turn off. The west Raman pumps and the west pilot laser may turn off in response to the signals from the west controller, as shown in FIG. 10. In the situation where the west RAM includes an OSC laser (e.g., OSC laser 320 in FIG. 3), the west controller may also turn off the west OSC laser at this time.

The loss of the pilot signal may be detected at the east RAM (block 1130). For example, since the west pilot laser has been turned off, there is no pilot signal to reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east Raman pumps may be turned off (block 1140). For example, when the east controller detects the loss of the pilot signal, the east controller may send a signal to the east Raman pumps to turn off. The east Raman pumps may turn off in response to the signal from the east controller, as shown in FIG. 10.

The east pilot laser may be modulated to transmit the RRF signal (block 1150). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 10.

The amplifiers of the east receiver and transmitter modules may be turned off (block 1160). The east receiver module may detect the loss of the C-band payload and/or OSC signal and turn off its amplifier. When the east receiver module turns off its amplifier, it triggers the east transmitter module to turn off its amplifier. The east transmitter module may then turn off its amplifier.

A BDI signal may be transmitted on the east-to-west link (block 1170). For example, when the east transmitter module turns off its amplifier, the east transmitter module may trigger the east OSC source, associated with the east transmitter module, to generate the BDI signal and output the BDI signal to the east WDM. The east WDM may optically combine the BDI signal with the pilot RRF signal and output the combined BDI signal and RRF signal on the east-to-west link, as shown in FIG. 10.

The BDI signal may be detected and the amplifiers of the west receiver and transmitter modules may be turned off (block 1180). For example, the west receiver module may detect the BDI signal from the east transmitter module, and turn off its amplifier. When the west receiver module turns off its amplifier, it triggers the west transmitter module to turn off its amplifier. The west transmitter module may then turn off its amplifier. Both the west-to-east and the east-to-west links are now completely safe. In other words, a technician may safely repair the link break.

Figure 12:
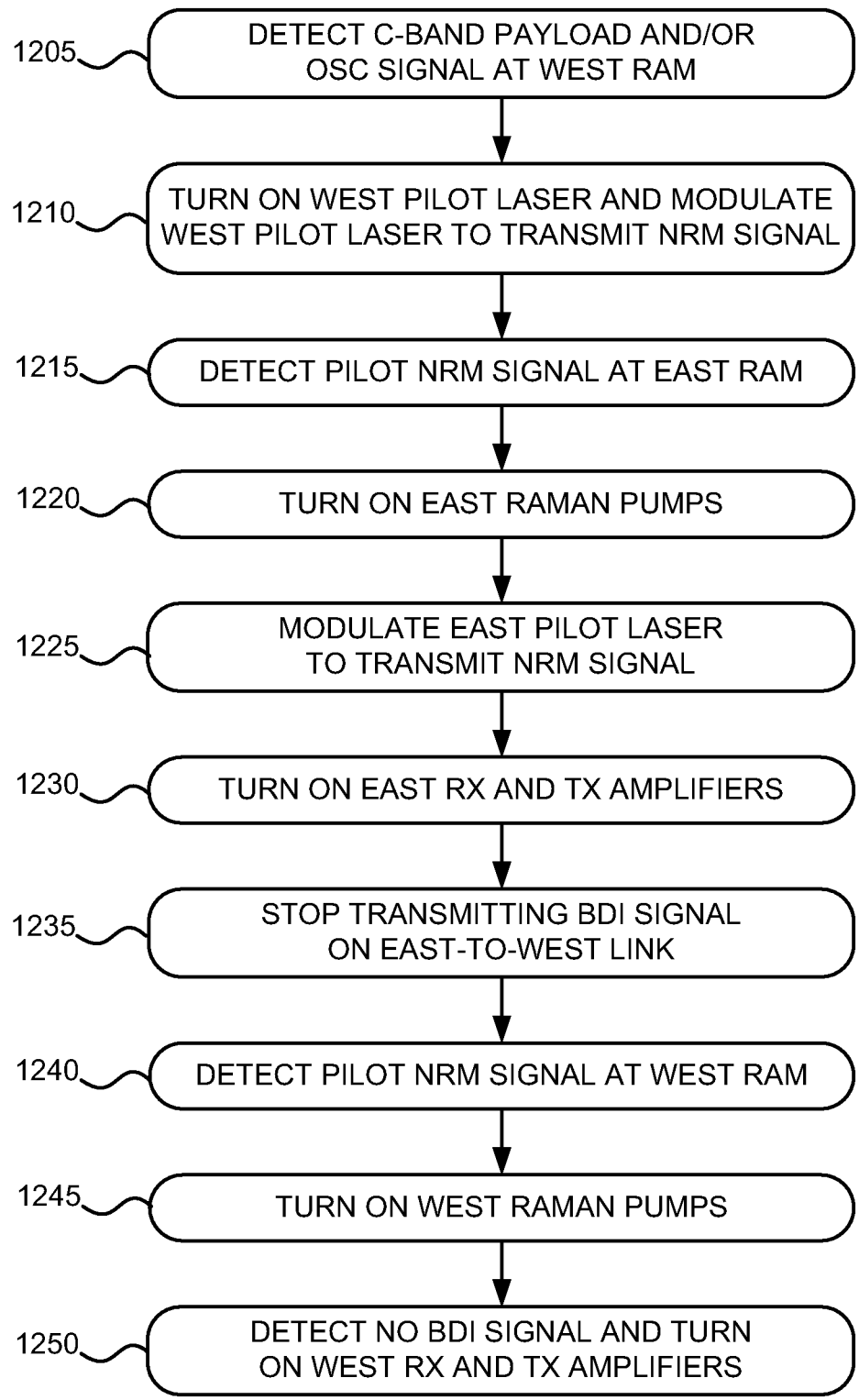
FIG. 12 is a flowchart of an exemplary process for restoring components in response to repair of the link break of FIG. 10.

FIG. 12 is a flowchart of an exemplary process for restoring components in response to repair of the link break. A C-band payload and/or OSC signal may be detected at the west RAM (block 1205). For example, due to repair of the link break, the C-band payload and OSC signal outputted by the west BMM/OAM can now reach the west RAM. The west controller (within the west RAM) may detect the restoration of the C-band payload and/or OSC signal. In the situation where the west RAM includes an OSC laser (e.g., OSC laser 320 in FIG. 3), the west controller may also turn on the west OSC laser at this time.

The west pilot laser may be turned on and modulated to transmit the NRM signal (block 1210). For example, the west controller may detect the pilot RRF signal from the east RAM. In response, the west controller may send a signal to the west pilot laser to turn on and modulate with the NRM signal. The west Raman pumps may remain turned off.

The pilot NRM signal may be detected at the east RAM (block 1215). For example, now that the west pilot laser has been turned on, the pilot NRM signal outputted by the west RAM can be received by the east RAM. The east controller (within the east RAM) may monitor the presence of the pilot signal and detect the NRM signal.

The east Raman pumps may be turned on (block 1220). For example, when the east controller detects the pilot NRM signal, the east controller may send a signal to the east Raman pumps to turn on. The east Raman pumps may turn on in response to the signal from the east controller.

The east pilot laser may be modulated to transmit the NRM signal (block 1225). For example, when the east controller detects the pilot NRM signal, the east controller may send a signal to the east pilot laser to modulate with the NRM signal. The east pilot laser may modulate with the NRM signal in response to the signal from the east controller.

The amplifiers of the east receiver and transmitter modules may be turned on (block 1230). The east receiver module may detect the C-band payload and/or OSC signal, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 1235). For example, when the east transmitter module turns on its amplifier, the east transmitter module may trigger the east OSC source, associated with the east transmitter module, to stop generating the BDI signal.

The pilot NRM signal may be detected at the west RAM (block 1240). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west Raman pumps may be turned on (block 1245). For example, when the west controller detects the pilot NRM signal from the east RAM, the west controller may send a signal to the west Raman pumps to turn on. The west Raman pumps may turn on in response to the signal from the west controller.

No BDI signal may be detected on the east-to-west link, and the amplifiers of the west receiver and transmitter modules may be turned on (block 1250). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 100 may return to normal operation.

Link Break on Local Receive Link

During normal operation (prior to the link break) (e.g., FIG. 1), west group 110 and east group 150 may exchange signals on the west-to-east link and the east-to-west link. For example, west group 110 may transmit signals to east group 150 on the west-to-east link, and east group 150 may transmit signals to west group 110 on the east-to-west link. During this time, pilot laser 210/340 may be turned on and may output a pilot NRM signal, and Raman pumps 230/360 may be turned on and may output pump power.

Figure 13:
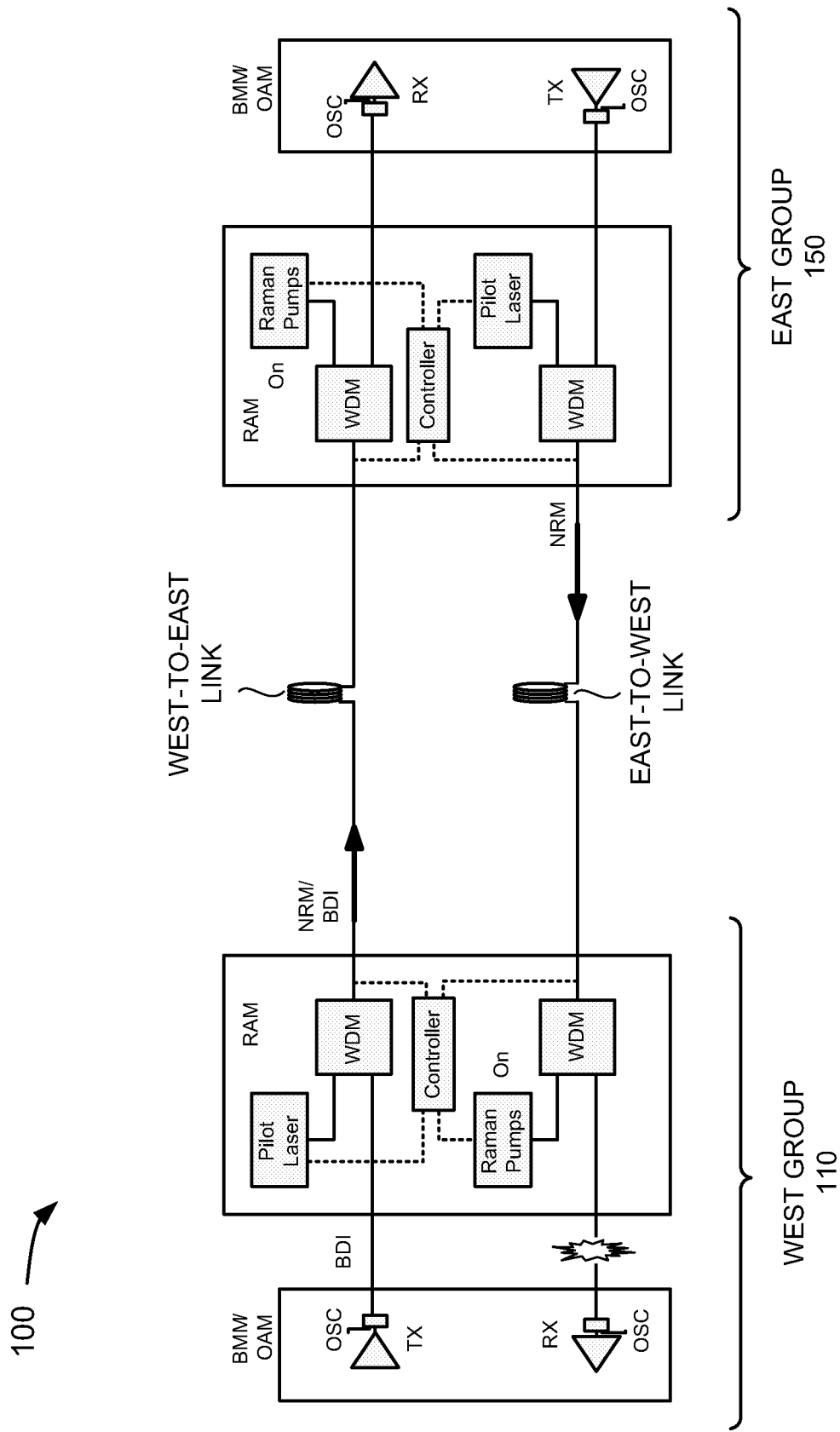
FIG. 13 is a diagram of the exemplary system of FIG. 1 in a situation where a link break occurs on a local receive link.
Figure 14:
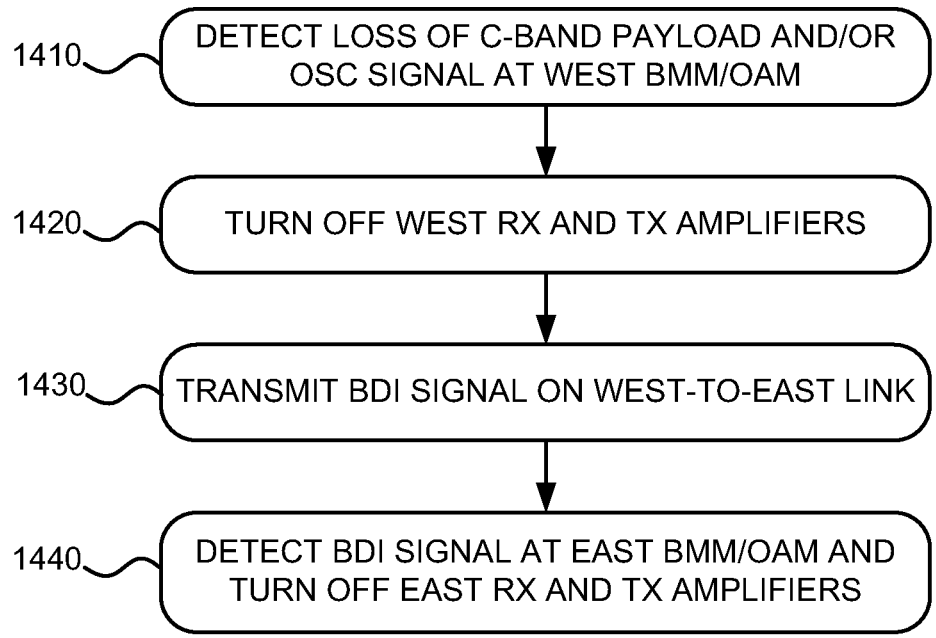
FIG. 14 is a flowchart of an exemplary process for shutting down components in response to the link break of FIG. 13.

Now assume that a link break occurs on the local receive link located between the west BMM/OAM and the west RAM. FIG. 13 is a diagram of exemplary system 100 in the situation where a link break occurs on the local receive link. FIG. 14 is a flowchart of an exemplary process for shutting down components in response to the link break. In the description to follow, reference will be made to certain components of west group 110 and east group 150. These components will be referred to as west and east components, respectively. For example, the RAM in west group 110 will be referred to as the west RAM, and the RAM in east group 150 will be referred to as the east RAM.

A loss of C-band payload and/or OSC signal may be detected at the west BMM/OAM (block 1410). For example, due to the link break, the C-band payload and OSC signal outputted by the east BMM/OAM cannot reach the west BMM/OAM. The west receiver module may detect this loss of the C-band payload and the OSC signal.

The amplifiers of the west receiver and transmitter modules may be turned off (block 1420). For example, the west receiver module may detect the loss of the C-band payload and/or OSC signal and turn off its amplifier. When the west receiver module turns off its amplifier, it triggers the west transmitter module to turn off its amplifier. The west transmitter module may then turn off its amplifier.

A BDI signal may be transmitted on the west-to-east link (block 1430). For example, when the west transmitter module turns off its amplifier, the west transmitter module may trigger the west OSC source, associated with the west transmitter module, to generate the BDI signal and output the BDI signal for transmission on the west-to-east link.

The BDI signal may be detected and the amplifiers of the east receiver and transmitter modules may be turned off (block 1440). For example, the east receiver module may detect the BDI signal from the west transmitter module, and turn off its amplifier. When the east receiver module turns off its amplifier, it triggers the east transmitter module to turn off its amplifier. The east transmitter module may then turn off its amplifier. Both the west-to-east and the east-to-west links are now completely safe. In other words, a technician may safely repair the link break.

Figure 15:
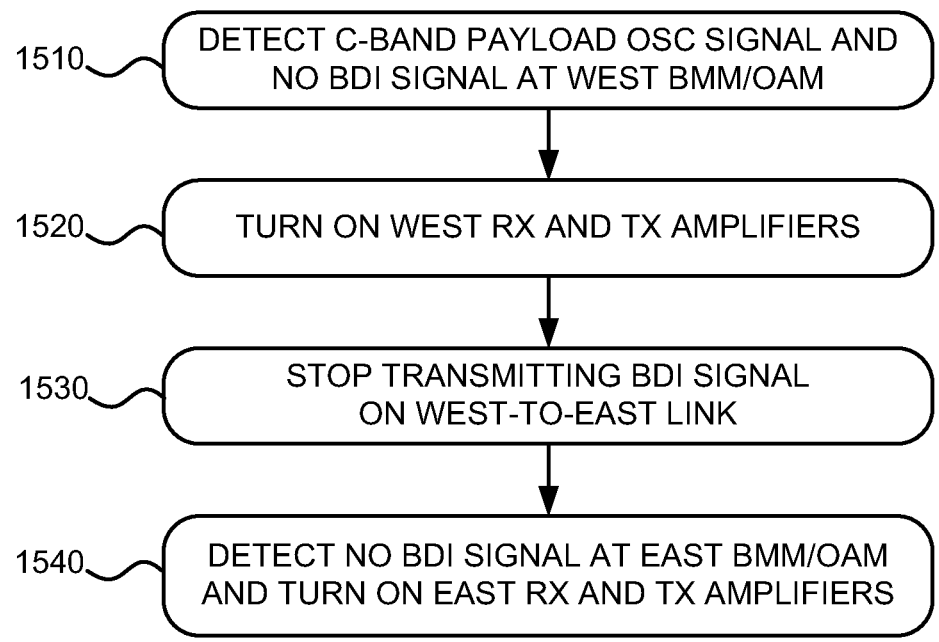
FIG. 15 is a flowchart of an exemplary process for restoring components in response to repair of the link break of FIG. 13.

FIG. 15 is a flowchart of an exemplary process for restoring components in response to repair of the link break. A C-band payload and/or OSC signal, and no BDI signal, may be detected at the west BMM/OAM (block 1510). For example, due to repair of the link break, the C-band payload and OSC signal outputted by the east BMM/OAM can now reach the west BMM/OAM. The west receiver module may detect this restoration of the C-band payload and the OSC signal.

The amplifiers of the west receiver and transmitter modules may be turned on (block 1520). For example, the west receiver module may detect the restoration of the C-band payload and/or OSC signal and turn on its amplifier. When the west receiver module turns on its amplifier, it triggers the west transmitter module to turn on its amplifier. The west transmitter module may then turn on its amplifier.

Transmission of the BDI signal may be stopped on the west-to-east link (block 1530). For example, when the west transmitter module turns on its amplifier, the west transmitter module may trigger the west OSC source, associated with the west transmitter module, to stop generating the BDI signal.

No BDI signal may be detected at the east BMM/OAM, and the amplifiers of the east receiver and transmitter modules may be turned on (block 1540). For example, the east receiver module may detect that the BDI signal from the west transmitter module has been terminated, and turn on its amplifier. When the east receiver module turns on its amplifier, it triggers the east transmitter module to turn on its amplifier. The east transmitter module may then turn on its amplifier. As a result, system 100 may return to normal operation.

Alternative Exemplary System

Figure 16:
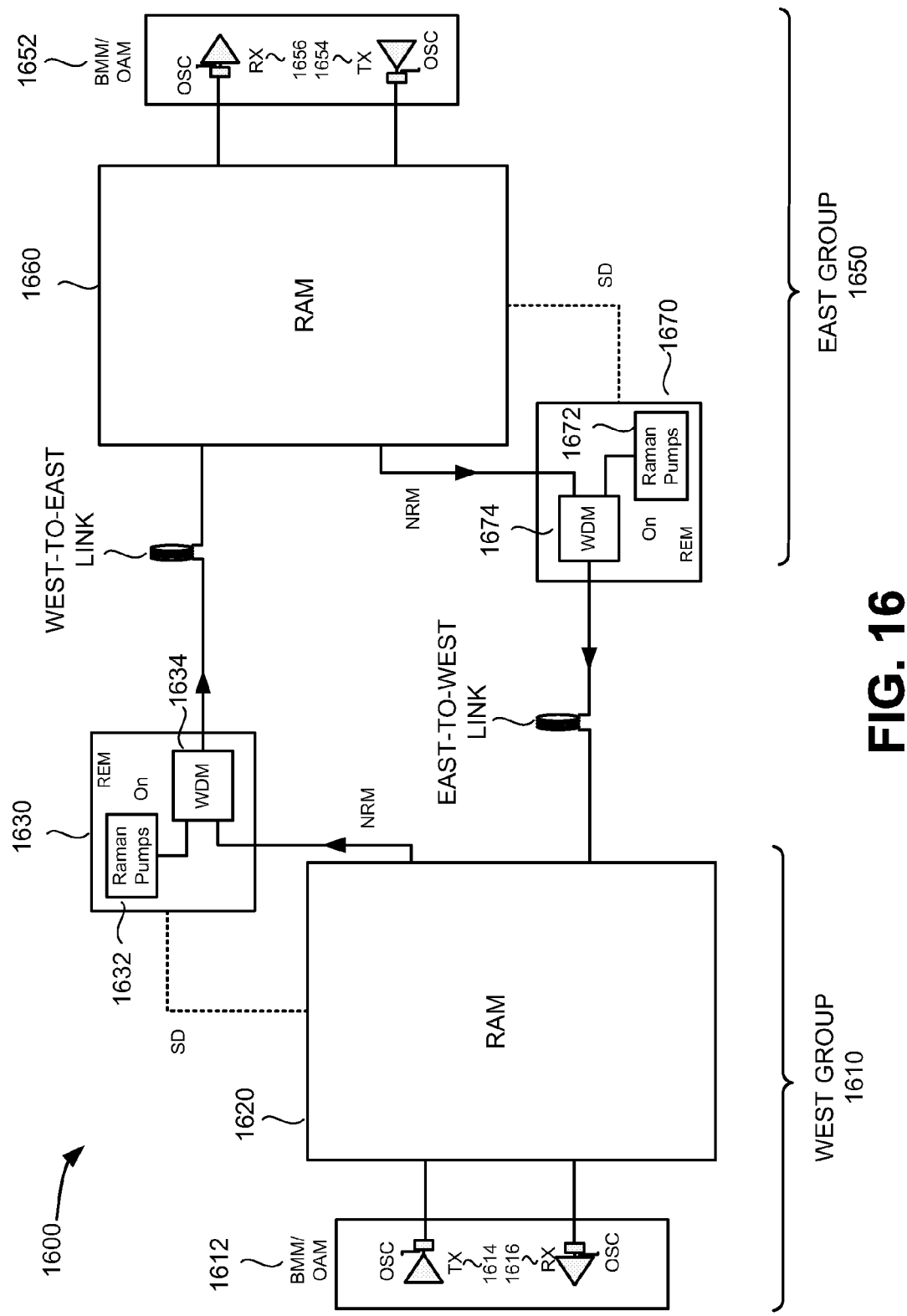
FIG. 16 is a diagram of another exemplary system in which systems and/or methods described herein may be implemented.

FIG. 16 is a diagram of an exemplary system 1600 in which systems and/or methods described herein may be implemented. While FIG. 16 shows a particular number and arrangement of components, system 1600 may include additional, fewer, different, or differently arranged components than those illustrated in FIG. 16. As shown in FIG. 16, system 1600 may include a west group of components (hereinafter referred to as "west group 1610") and an east group of components (hereinafter referred to as "east group 1650") connected by a west-to-east link and an east-to-west link. The west-to-east link and the east-to-west link may include optical fibers.

West group 1610 may include a BMM/OAM 1612, a RAM 1620, and a Raman extender module (REM) 1630. BMM/OAM 1612 may include a transmitter (TX) module 1614 and a receiver (RX) module 1616. Transmitter module 1614 may generally be referred to as an optical source. In one implementation, transmitter module 1614 may include an amplifier (e.g., an EDFA) that may output a C-band payload (e.g., optical signals with in the range of approximately 1530-1565 nm), and an OSC source that may output an OSC signal (e.g., optical signal with in the range of approximately 1505-1520 nm). Transmitter module 1614 may also include a WDM that may optically combine the C-band payload and the OSC signal for output from BMM/OAM 1612. Receiver module 1616 may generally be referred to as an optical signal detector. In one implementation, receiver module 1616 may include an amplifier (e.g., an EDFA) that may receive a C-band payload, and an OSC detector that may receive an OSC signal. Receiver module 1616 may also include a WDM that may receive a combined C-band payload and OSC signal at an input of BMM/OAM 1612 and optically separate the C-band payload and the OSC signal for presentation to the amplifier and OSC detector, respectively.

RAM 1620 may include components for performing Raman amplification. RAM 1620 may include components similar to the components of RAM 118 shown in FIG. 2 or FIG. 3. RAM 1620 differs from RAM 118, however, in that the controller of RAM 1620 generates an additional signal that was not generated by the controller of RAM 118. The controller of RAM 1620 generates a shutdown (SD) signal that the controller may output to REM 1630, as described below. In one implementation, the SD signal may include a signal line that can be asserted or de-asserted to cause certain operations to be performed by REM 1630. In this case, generating the SD signal may refer to asserting (or de-asserting) the signal line.

REM 1630 may perform Raman amplification by launching pump power in the same direction as the C-band payload. As shown in FIG. 16, REM 1630 may include Raman pumps 1632 and WDM 1634. Raman pumps 1632 may generally be referred to as an optical source that provides distributed amplification. In one implementation, Raman pumps 1632 may include one or more pump lasers that produce pump power (also called pump light) (e.g., optical signals with in the range of approximately 1420-1460 nm) that may be transmitted so as to co-propagate with the C-band payload, OSC signal, and pilot signal. WDM 1634 may include an optical multiplexer that may receive the combined C-band payload, OSC signal, and pilot signal from RAM 1620 and optically combine the combined C-band payload, OSC signal, and pilot signal with the pump power from Raman pumps 1632 for output on the west-to-east link.

East group 1650 may include a BMM/OAM 1652, a RAM 1660, and a REM 1670. BMM/OAM 1652 may include a transmitter (TX) module 1654 and a receiver (RX) module 1656. Transmitter module 1654 and receiver module 1656 may be similar in construction and operation to transmitter module 1614 and receiver module 1616, respectively, described with regard to west group 1610. RAM 1660 may be similar in construction and operation to RAM 1620 described with regard to west group 1610. REM 1670 may include Raman pumps 1672 and WDM 1674. Raman pumps 1672 and WDM 1674 may be similar in construction and operation to Raman pumps 1632 and WDM 1634 described with regard to west group 1610.

Link Break on West-to-East Link

During normal operation (prior to the link break) (e.g., FIG. 16), west group 1610 and east group 1650 may exchange signals on the west-to-east link and the east-to-west link. For example, west group 1610 may transmit signals to east group 1650 on the west-to-east link, and east group 1650 may transmit signals to west group 1610 on the east-to-west link. During this time, pilot laser 210/340 may be turned on and may output a pilot NRM signal, and Raman pumps 230/360/1632/1670 may be turned on and may output pump power.

Figure 17:
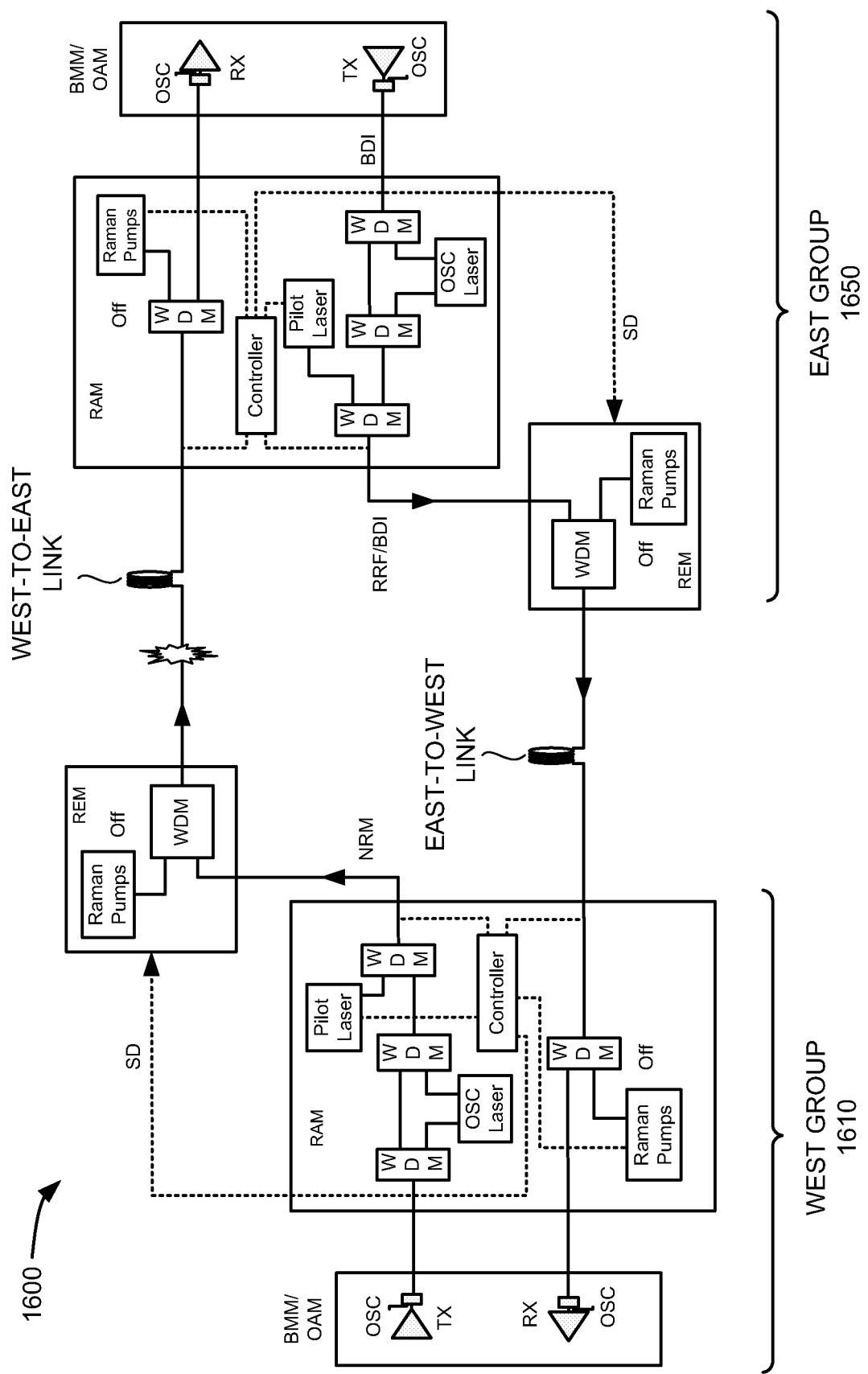
FIG. 17 is a diagram of the exemplary system of FIG. 16 in a situation where a link break occurs on a west-to-east link.
Figure 18:
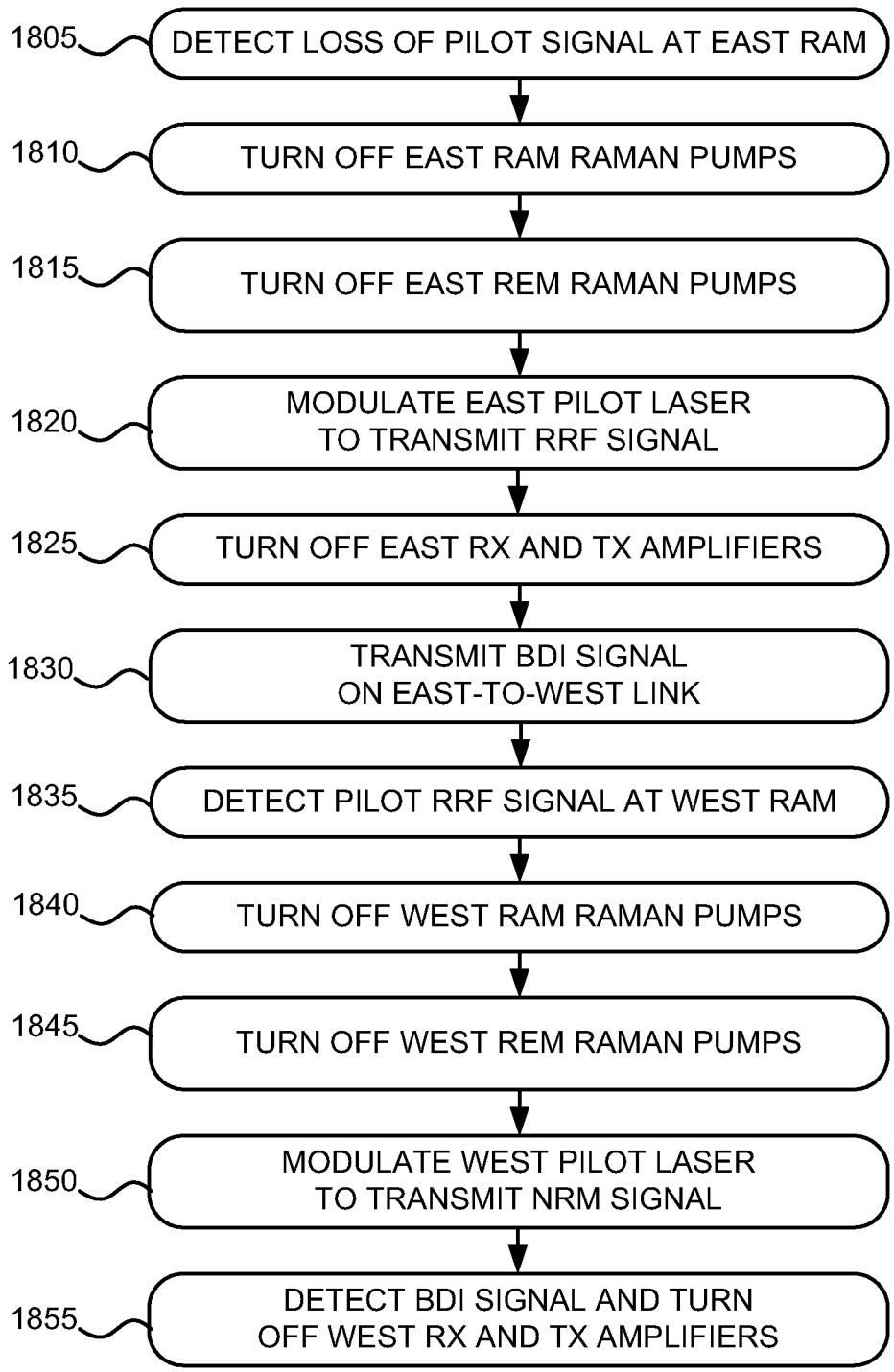
FIG. 18 is a flowchart of an exemplary process for shutting down components in response to the link break of FIG. 17.

Now assume that a link break occurs on the west-to-east link. FIG. 17 is a diagram of exemplary system 1600 in the situation where a link break occurs on the west-to-east link. FIG. 18 is a flowchart of an exemplary process for shutting down components in response to the link break. In the description to follow, reference will be made to certain components of west group 1610 and east group 1650. These components will be referred to as west and east components, respectively. For example, the RAM in west group 1610 will be referred to as the west RAM, and the RAM in east group 1650 will be referred to as the east RAM.

The loss of the pilot signal may be detected at the east RAM (block 1805). For example, due to the link break, the pilot signal outputted by the west RAM cannot reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east RAM Raman pumps may be turned off (block 1810). For example, when the east controller detects the loss of the pilot signal, the east controller may send a signal to the east RAM Raman pumps to turn off. The east RAM Raman pumps may turn off in response to the signal from the east controller, as shown in FIG. 17.

The east REM Raman pumps may be turned off (block 1815). For example, when the east controller detects the loss of the pilot signal, the east controller may generate the SD signal and send the SD signal to the east REM Raman pumps. The east REM Raman pumps may turn off in response to the SD signal from the east controller, as shown in FIG. 17.

The east pilot laser may be modulated to transmit the RRF signal (block 1820). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 17.

The amplifiers of the east receiver and transmitter modules may be turned off (block 1825). The east receiver module may detect the loss of the C-band payload and/or OSC signal, as a result of the link break, and turn off its amplifier. When the east receiver module turns off its amplifier, it triggers the east transmitter module to turn off its amplifier. The east transmitter module may then turn off its amplifier.

A BDI signal may be transmitted on the east-to-west link (block 1830). For example, when the east transmitter module turns off its amplifier, the east transmitter module may trigger the east OSC source, associated with the east transmitter module, to generate the BDI signal and output the BDI signal to be optically combined with the pilot RRF signal and output on the east-to-west link.

The pilot RRF signal may be detected at the west RAM (block 1835). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the RRF signal.

The west RAM Raman pumps may be turned off (block 1840). For example, when the west controller detects the pilot RRF signal from the east RAM, the west controller may send a signal to the west RAM Raman pumps to turn off. The west RAM Raman pumps may turn off in response to the signal from the west controller, as shown in FIG. 17.

The west REM Raman pumps may be turned off (block 1845). For example, when the west controller detects the pilot RRF signal from the east RAM, the west controller may generate the SD signal and send the SD signal to the west REM Raman pumps. The west REM Raman pumps may turn off in response to the SD signal from the west controller, as shown in FIG. 17.

The west pilot laser may be modulated to transmit the NRM signal (block 1850). For example, when the west controller detects the pilot RRF signal from the east RAM, the west controller may send a signal to the west pilot laser to modulate with the NRM signal. The west pilot laser may modulate with the NRM signal in response to the signal from the west controller, as shown in FIG. 17.

The BDI signal may be detected and the amplifiers of the west receiver and transmitter modules may be turned off (block 1855). For example, the west receiver module may detect the BDI signal from the east transmitter module, and turn off its amplifier. When the west receiver module turns off its amplifier, it triggers the west transmitter module to turn off its amplifier. The west transmitter module may then turn off its amplifier. Both the west-to-east and the east-to-west links are now completely safe. In other words, a technician may safely repair the link break.

Figure 19:
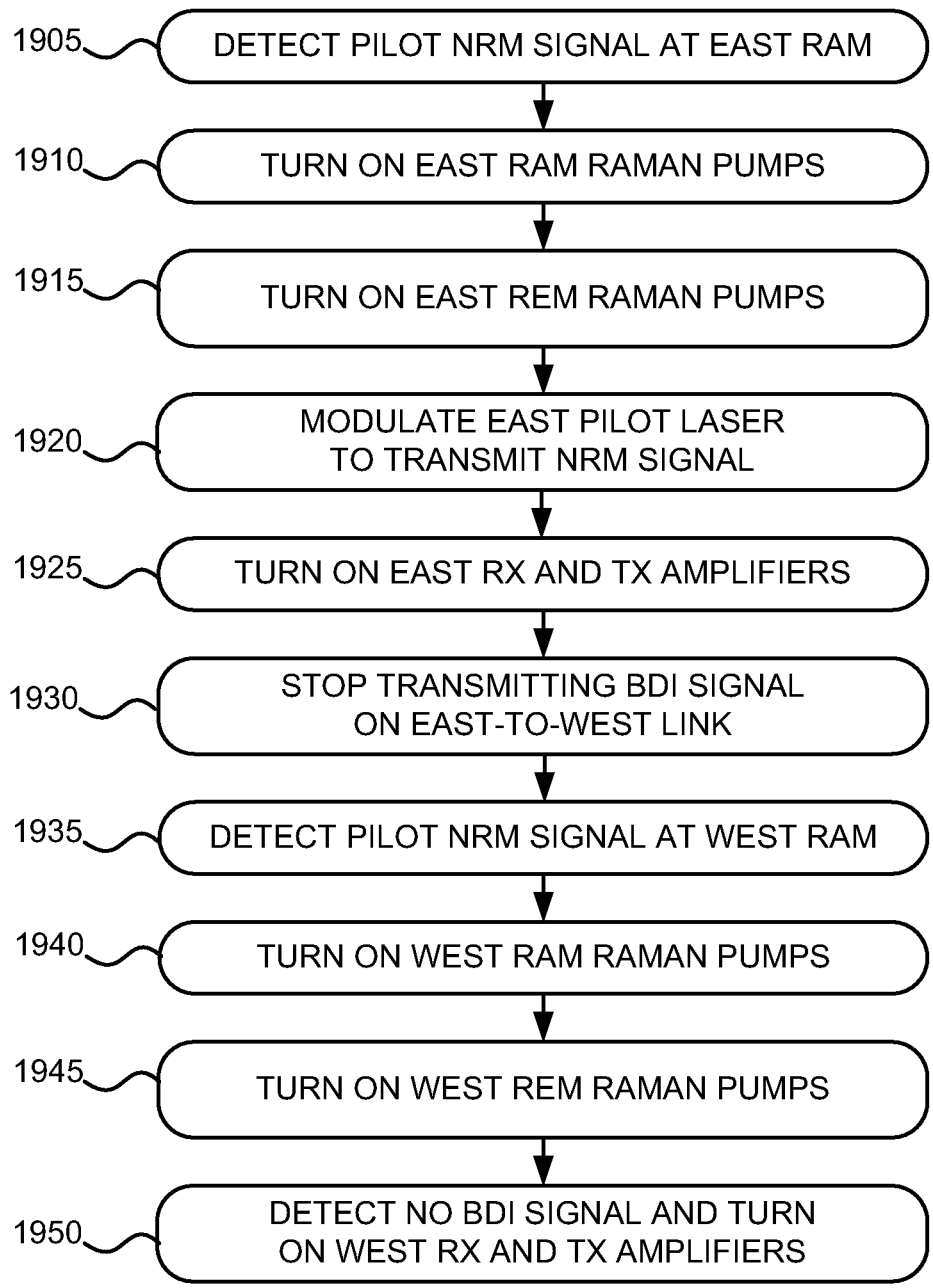
FIG. 19 is a flowchart of an exemplary process for restoring components in response to repair of the link break of FIG. 17.

FIG. 19 is a flowchart of an exemplary process for restoring components in response to repair of the link break. The pilot NRM signal may be detected at the east RAM (block 1905). For example, now that the link break has been repaired, the pilot NRM signal outputted by the west RAM can reach the east RAM. The east controller (within the east RAM) may monitor the presence of the pilot signal and detect the NRM signal.

The east RAM Raman pumps may be turned on (block 1910). For example, when the east controller detects the pilot NRM signal, the east controller may send a signal to the east RAM Raman pumps to turn on. The east RAM Raman pumps may turn on in response to the signal from the east controller.

The east REM Raman pumps may be turned on (block 1915). For example, when the east controller detects the pilot NRM signal, the east controller may discontinue the SD signal. The east REM Raman pumps may turn on in response to the discontinuing of the SD signal from the east controller.

The east pilot laser may be modulated to transmit the NRM signal (block 1920). For example, when the east controller detects the pilot NRM signal, the east controller may send a signal to the east pilot laser to modulate with the NRM signal. The east pilot laser may modulate with the NRM signal in response to the signal from the east controller.

The amplifiers of the east receiver and transmitter modules may be turned on (block 1925). The east receiver module may detect the C-band payload and/or OSC signal, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 1930). For example, when the east transmitter module turns on its amplifier, the east transmitter module may trigger the east OSC source, associated with the east transmitter module, to stop generating the BDI signal.

The pilot NRM signal may be detected at the west RAM (block 1935). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west RAM Raman pumps may be turned on (block 1940). For example, when the west controller detects the pilot NRM signal from the east RAM, the west controller may send a signal to the west RAM Raman pumps to turn on. The west RAM Raman pumps may turn on in response to the signal from the west controller.

The west REM Raman pumps may be turned on (block 1945). For example, when the west controller detects the pilot NRM signal, the west controller may discontinue the SD signal. The west REM Raman pumps may turn on in response to the discontinuing of the SD signal from the west controller.

No BDI signal may be detected on the east-to-west link, and the amplifiers of the west receiver and transmitter modules may be turned on (block 1950). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 1600 may return to normal operation.

Link Break on Local Link

During normal operation (prior to the link break) (e.g., FIG. 16), west group 1610 and east group 1650 may exchange signals on the west-to-east link and the east-to-west link. For example, west group 1610 may transmit signals to east group 1650 on the west-to-east link, and east group 1650 may transmit signals to west group 1610 on the east-to-west link. During this time, pilot laser 210/340 may be turned on and may output a pilot NRM signal, and Raman pumps 230/360/1632/1670 may be turned on and may output pump power.

Figure 20:
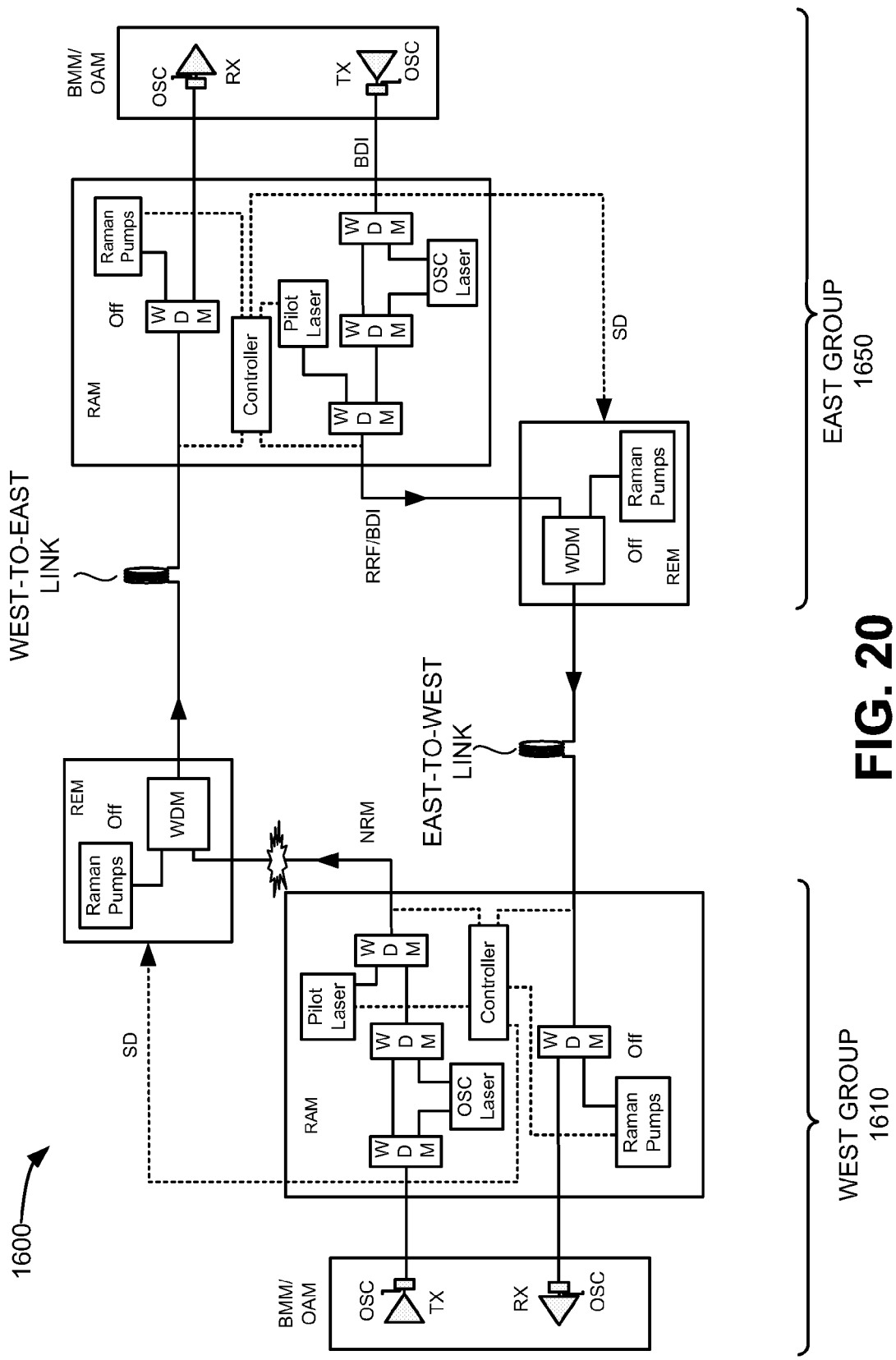
FIG. 20 is a diagram of the exemplary system of FIG. 16 in a situation where a link break occurs on a local link.
Figure 21:
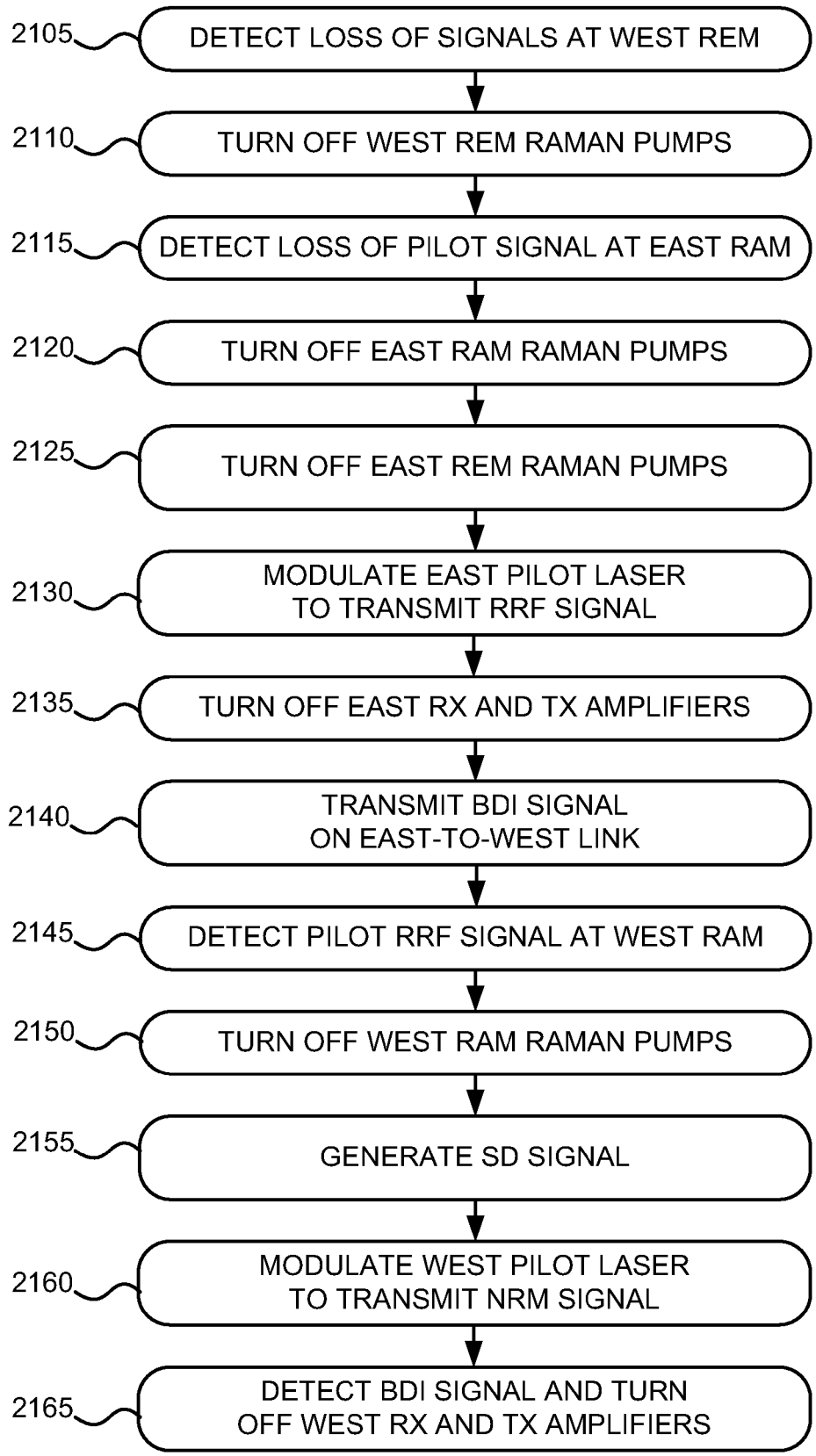
FIG. 21 is a flowchart of an exemplary process for shutting down components in response to the link break of FIG. 20.

Now assume that a link break occurs on the local link connecting the west RAM to the west REM. FIG. 20 is a diagram of exemplary system 1600 in the situation where a link break occurs on the local link. FIG. 21 is a flowchart of an exemplary process for shutting down components in response to the link break. In the description to follow, reference will be made to certain components of west group 1610 and east group 1650. These components will be referred to as west and east components, respectively. For example, the RAM in west group 1610 will be referred to as the west RAM, and the RAM in east group 1650 will be referred to as the east RAM.

A loss of signals may be detected at west REM (block 2105). For example, the west REM may detect the loss of the C-band payload, the OSC signal, and the pilot signal.

The west REM Raman pumps may be turned off (block 2110). For example, in response to the loss of the signals, the west REM may turn off the west REM Raman pumps (regardless of the state of the SD signal), as shown in FIG. 20.

The loss of the pilot signal may be detected at the east RAM (block 2115). For example, due to the link break, the pilot signal outputted by the west RAM cannot reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east RAM Raman pumps may be turned off (block 2120). For example, when the east controller detects the loss of the pilot signal, the east controller may send a signal to the east RAM Raman pumps to turn off. The east RAM Raman pumps may turn off in response to the signal from the east controller, as shown in FIG. 20.

The east REM Raman pumps may be turned off (block 2125). For example, when the east controller detects the loss of the pilot signal, the east controller may generate the SD signal and send the SD signal to the east REM Raman pumps. The east REM Raman pumps may turn off in response to the SD signal from the east controller, as shown in FIG. 20.

The east pilot laser may be modulated to transmit the RRF signal (block 2130). For example, when the east controller detects the loss of the pilot signal, the east controller may send a signal to the east pilot laser to modulate with the RRF signal.

The east pilot laser may modulate with the RRF signal in response to the signal from the east controller, as shown in FIG. 20.

The amplifiers of the east receiver and transmitter modules may be turned off (block 2135). The east receiver module may detect the loss of the C-band payload and/or OSC signal and turn off its amplifier. When the east receiver module turns off its amplifier, it triggers the east transmitter module to turn off its amplifier. The east transmitter module may then turn off its amplifier.

A BDI signal may be transmitted on the east-to-west link (block 2140). For example, when the east transmitter module turns off its amplifier, the east transmitter module may trigger the east OSC source, associated with the east transmitter module, to generate the BDI signal and output the BDI signal to be optically combined with the pilot RRF signal and output on the east-to-west link.

The pilot RRF signal may be detected at the west RAM (block 2145). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the RRF signal.

The west RAM Raman pumps may be turned off (block 2150). For example, when the west controller detects the pilot RRF signal from the east RAM, the west controller may send a signal to the west RAM Raman pumps to turn off. The west RAM Raman pumps may turn off in response to the signal from the west controller, as shown in FIG. 20.

The SD signal may be generated (block 2155). For example, when the west controller detects the pilot RRF signal from the east RAM, the west controller may generate the SD signal and send the SD signal to the west REM Raman pumps. The west REM Raman pumps are already turned off, and remain turned off, as shown in FIG. 20.

The west pilot laser may be modulated to transmit the NRM signal (block 2160). For example, when the west controller detects the pilot RRF signal from the east RAM, the west controller may send a signal to the west pilot laser to modulate with the NRM signal. The west pilot laser may modulate with the NRM signal in response to the signal from the west controller, as shown in FIG. 20.

The BDI signal may be detected and the amplifiers of the west receiver and transmitter modules may be turned off (block 2165). For example, the west receiver module may detect the BDI signal from the east transmitter module, and turn off its amplifier. When the west receiver module turns off its amplifier, it triggers the west transmitter module to turn off its amplifier. The west transmitter module may then turn off its amplifier. Both the west-to-east and the east-to-west links are now completely safe. In other words, a technician may safely repair the link break.

Figure 22:
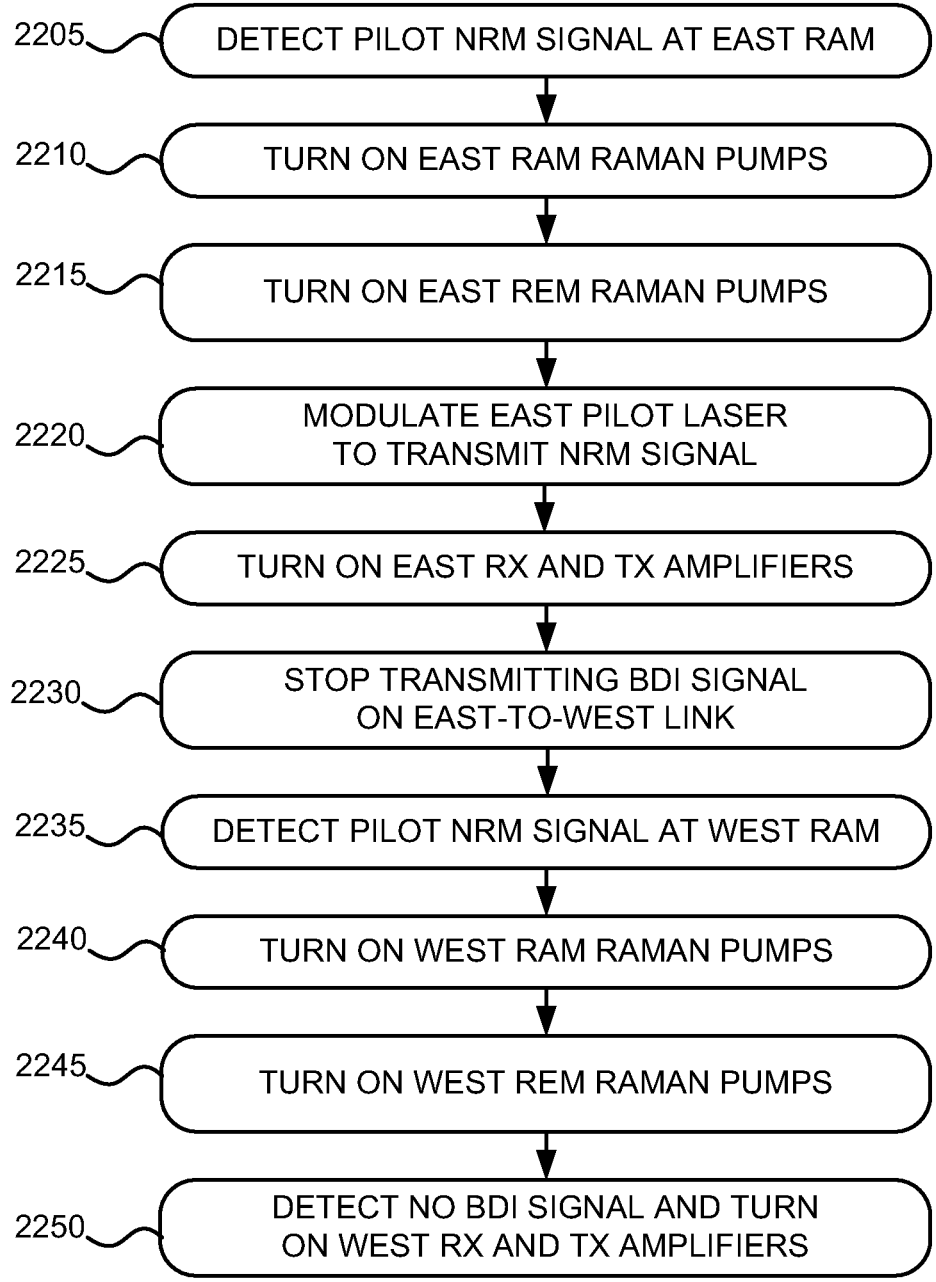
FIG. 22 is a flowchart of an exemplary process for restoring components in response to repair of the link break of FIG. 20.

FIG. 22 is a flowchart of an exemplary process for restoring components in response to repair of the link break. Once the local link break is repaired, the west REM detects the C-band payload, OSC signal, and pilot signal. The west REM may keep the west REM Raman pumps shut down because the SD signal is asserted, but may permit the C-band payload, OSC signal, and pilot signal to be outputted on the west-to-east link.

The pilot NRM signal may be detected at the east RAM (block 2205). For example, now that the link break has been repaired, the pilot NRM signal outputted by the west RAM can reach the east RAM. The east controller (within the east RAM) may monitor the presence of the pilot signal and detect the NRM signal.

The east RAM Raman pumps may be turned on (block 2210). For example, when the east controller detects the pilot NRM signal, the east controller may send a signal to the east RAM Raman pumps to turn on. The east RAM Raman pumps may turn on in response to the signal from the east controller.

The east REM Raman pumps may be turned on (block 2215). For example, when the east controller detects the pilot NRM signal, the east controller may discontinue the SD signal. The east REM Raman pumps may turn on in response to the discontinuing of the SD signal from the east controller.

The east pilot laser may be modulated to transmit the NRM signal (block 2220). For example, when the east controller detects the pilot NRM signal, the east controller may send a signal to the east pilot laser to modulate with the NRM signal. The east pilot laser may modulate with the NRM signal in response to the signal from the east controller.

The amplifiers of the east receiver and transmitter modules may be turned on (block 2225). The east receiver module may detect the C-band payload and/or OSC signal, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 2230). For example, when the east transmitter module turns on its amplifier, the east transmitter module may trigger the east OSC source, associated with the east transmitter module, to stop generating the BDI signal.

The pilot NRM signal may be detected at the west RAM (block 2235). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west RAM Raman pumps may be turned on (block 2240). For example, when the west controller detects the pilot NRM signal from the east RAM, the west controller may send a signal to the west RAM Raman pumps to turn on. The west RAM Raman pumps may turn on in response to the signal from the west controller.

The west REM Raman pumps may be turned on (block 2245). For example, when the west controller detects the pilot NRM signal, the west controller may discontinue the SD signal. The west REM Raman pumps may turn on in response to the discontinuing of the SD signal from the west controller.

No BDI signal may be detected on the east-to-west link, and the amplifiers of the west receiver and transmitter modules may be turned on (block 2250). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 1600 may return to normal operation.

Link Breaks on Both West-to-East Link and East-to-West Link

During normal operation (prior to the link break) (e.g., FIG. 16), west group 1610 and east group 1650 may exchange signals on the west-to-east link and the east-to-west link. For example, west group 1610 may transmit signals to east group 1650 on the west-to-east link, and east group 1650 may transmit signals to west group 1610 on the east-to-west link. During this time, pilot laser 210/340 may be turned on and may output a pilot NRM signal, and Raman pumps 230/360/1632/1672 may be turned on and may output pump power.

Figure 23:
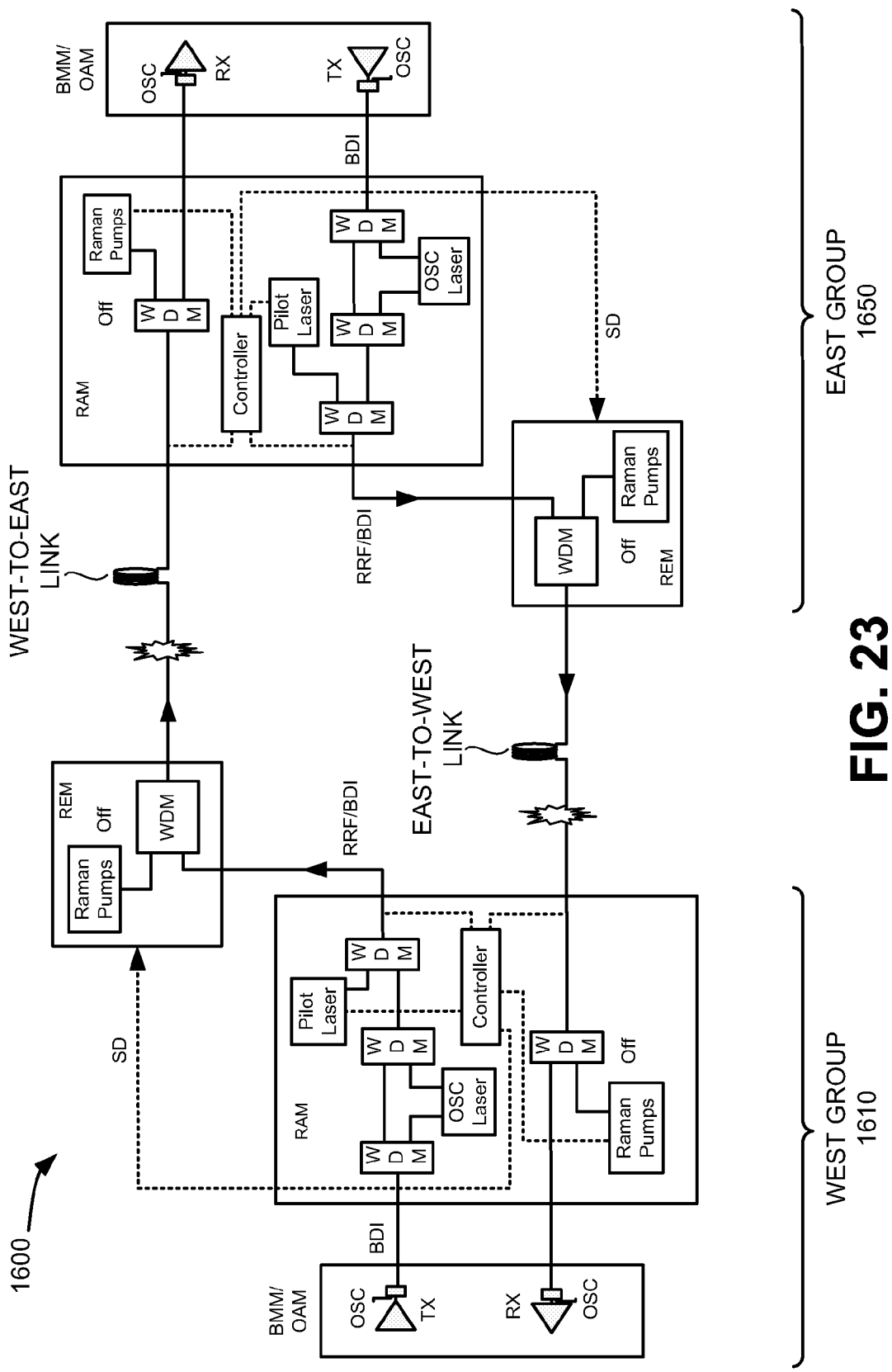
FIG. 23 is a diagram of the exemplary system of FIG. 16 in a situation where link breaks occur on both a west-to-east link and an east-to-west link.
Figure 24:
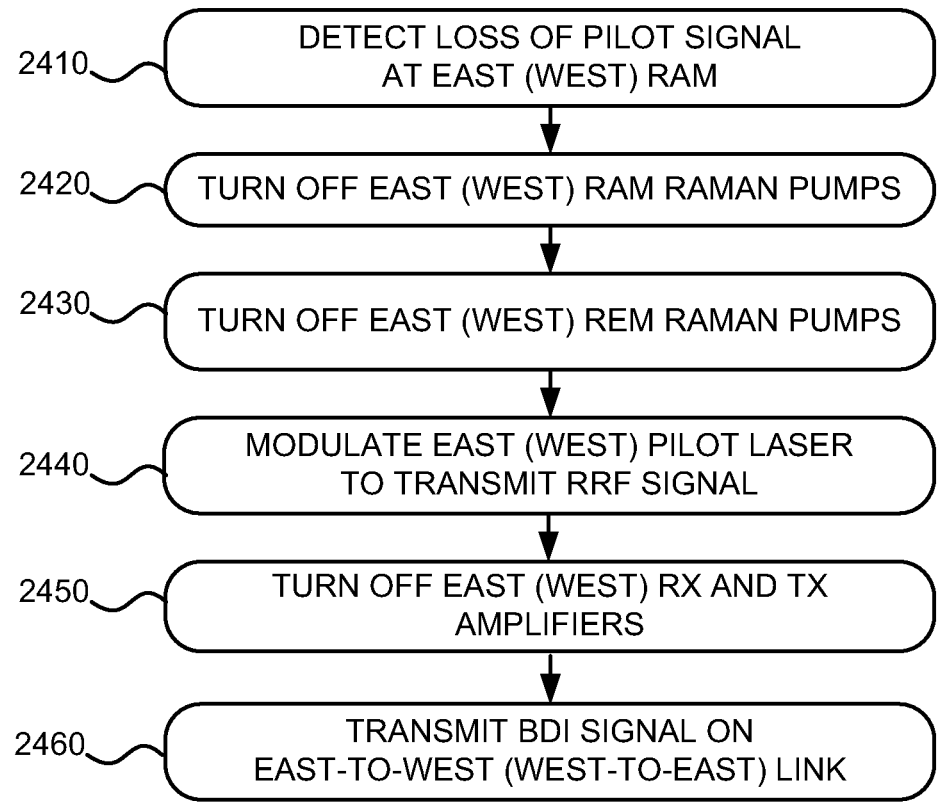
FIG. 24 is a flowchart of an exemplary process for shutting down components in response to the link breaks of FIG. 23.

Now assume that link breaks occur on both the west-to-east link and the east-to-west link. FIG. 23 is a diagram of exemplary system 1600 in the situation where link breaks occur on both the west-to-east link and the east-to-west link. FIG. 24 is a flowchart of an exemplary process for shutting down components in response to the link breaks. In the description to follow, reference will be made to certain components of west group 1610 and east group 1650. These components will be referred to as west and east components, respectively. For example, the RAM in west group 1610 will be referred to as the west RAM, and the RAM in east group 1650 will be referred to as the east RAM.

The loss of the pilot signal may be detected at the east RAM (block 2410). For example, due to the link break, the pilot signal outputted by the west RAM cannot reach the east RAM. The east controller (within the east RAM) may monitor the presence of the pilot signal. Because the pilot signal is generated at 1610 nm, the east controller can differentiate the presence or absence of the pilot signal even in the presence of noise generated by the east Raman pumps, which may be in the range of approximately 1420-1460 nm.

The east RAM Raman pumps may be turned off (block 2420). For example, when the east controller detects the loss of the pilot signal, the east controller may send a signal to the east Raman pumps to turn off. The east Raman pumps may turn off in response to the signal from the east controller, as shown in FIG. 23.

The east REM Raman pumps may be turned off (block 2430). For example, when the east controller detects the loss of the pilot signal, the east controller may generate the SD signal and send the SD signal to the east REM Raman pumps. The east REM Raman pumps may turn off in response to the SD signal from the east controller, as shown in FIG. 23.

The east pilot laser may be modulated to transmit the RRF signal (block 2440). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 23.

The amplifiers of the east receiver and transmitter modules may be turned off (block 2450). The east receiver module may detect the loss of the C-band payload and/or OSC signal, as a result of the link break, and turn off its amplifier. When the east receiver module turns off its amplifier, it triggers the east transmitter module to turn off its amplifier. The east transmitter module may then turn off its amplifier.

A BDI signal may be transmitted on the east-to-west link (block 2460). For example, when the east transmitter module turns off its amplifier, the east transmitter module may trigger the east OSC source, associated with the east transmitter module, to generate the BDI signal and output the BDI signal to the east WDM. The east WDM may optically combine the BDI signal with the pilot RRF signal and output the combined BDI signal and RRF signal on the east-to-west link. The combined BDI signal and RRF signal will not arrive at west group 1610 due to the link break on the east-to-west link.

Simultaneously, or substantially simultaneously, blocks 2410-2460 may be performed by west group 1610. As a result, both the west-to-east and the east-to-west links are now completely safe. In other words, a technician may safely repair the link breaks.

Figure 25:
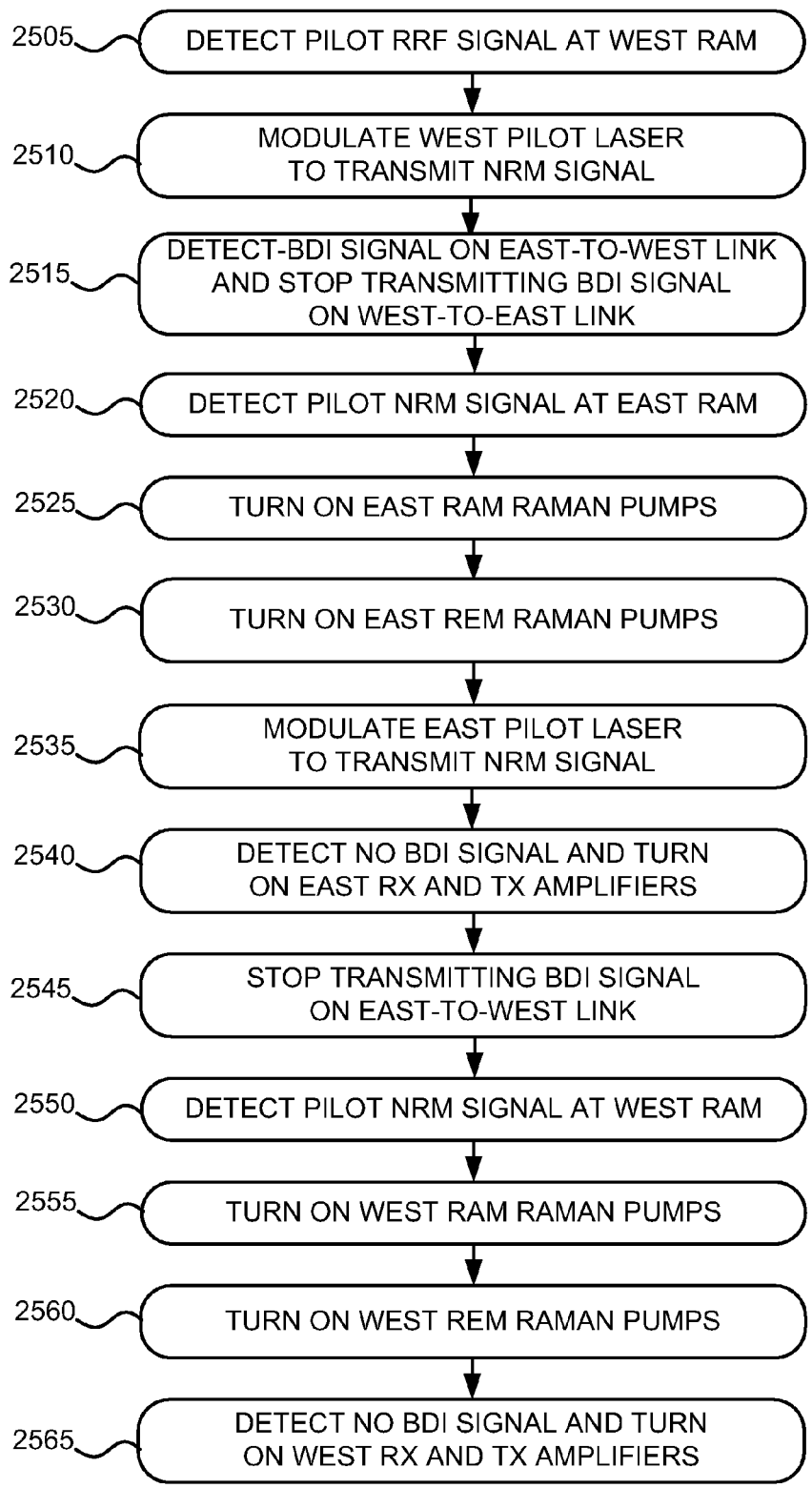
FIG. 25 is a flowchart of an exemplary process for restoring components in response to repair of the link breaks of FIG. 23.

FIG. 25 is a flowchart of an exemplary process for restoring components in response to repair of the link breaks. Assume, for example, that the east-to-west link is repaired first. The pilot RRF signal may be detected at the west RAM (block 2505). For example, now that the link break on the east-to-west link has been repaired, the pilot RRF signal outputted by the east RAM can reach the west RAM. The west controller (within the west RAM) may monitor the presence of the pilot signal and detect the RRF signal. In response to the pilot RRF signal, the west controller may keep the west RAM and REM Raman pumps turned off.

The west pilot laser may be modulated to transmit the NRM signal (block 2510). For example, the west controller may send a signal to the west pilot laser to modulate with the NRM signal. The west pilot laser may modulate with the NRM signal in response to the signal from the west controller.

The BDI signal may be detected on the east-to-west link and the transmitting of the BDI signal on the west-to-east link may be stopped (block 2515). For example, the west receiver module may detect the restoration of the C-band payload and/or the OSC signal, and detect the BDI signal sent from east group 1650. The west receiver module may keep its amplifier turned off and signal the west transmitter module to stop transmitting the BDI signal.

When the west-to-east link is repaired, the pilot NRM signal may be detected at the east RAM (block 2520). For example, now that the link break on the west-to-east link has been repaired, the pilot NRM signal outputted by the west RAM can reach the east RAM. The east controller (within the east RAM) may monitor the presence of the pilot signal and detect the NRM signal.

The east RAM Raman pumps may be turned on (block 2525). For example, when the east controller detects the pilot NRM signal, the east controller may send a signal to the east RAM Raman pumps to turn on. The east RAM Raman pumps may turn on in response to the signal from the east controller.

The east REM Raman pumps may be turned on (block 2530). For example, when the east controller detects the pilot NRM signal, the east controller may discontinue the SD signal. The east REM Raman pumps may turn on in response to the discontinuing of the SD signal from the east controller.

The east pilot laser may be modulated to transmit the NRM signal (block 2535). For example, when the east controller detects the pilot NRM signal, the east controller may send a signal to the east pilot laser to modulate with the NRM signal. The east pilot laser may modulate with the NRM signal in response to the signal from the east controller.

No BDI signal may be detected, and the amplifiers of the east receiver and transmitter modules may be turned on (block 2540). The east receiver module may detect restoration of the C-band payload and/or the OSC signal on the west-to-east link, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI may no longer be transmitted on the east-to-west link (block 2545). For example, when the east transmitter module turns on its amplifier, the east transmitter module may trigger the east OSC source, associated with the east transmitter module, to stop generating the BDI signal.

The pilot NRM signal may be detected at the west RAM (block 2550). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west RAM Raman pumps may be turned on (block 2555). For example, when the west controller detects the pilot NRM signal from the east RAM, the west controller may send a signal to the west RAM Raman pumps to turn on. The west RAM Raman pumps may turn on in response to the signal from the west controller.

The west REM Raman pumps may be turned on (block 2560). For example, when the west controller detects the pilot NRM signal, the west controller may discontinue the SD signal. The west REM Raman pumps may turn on in response to the discontinuing of the SD signal from the west controller.

No BDI signal may be detected on the east-to-west link, and the amplifiers of the west receiver and transmitter modules may be turned on (block 2565). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 1600 may return to normal operation.

Link Break on Local Transmit Link

During normal operation (prior to the link break) (e.g., FIG. 16), west group 1610 and east group 1650 may exchange signals on the west-to-east link and the east-to-west link. For example, west group 1610 may transmit signals to east group 1650 on the west-to-east link, and east group 1650 may transmit signals to west group 1610 on the east-to-west link. During this time, pilot laser 210/340 may be turned on and may output a pilot NRM signal, and Raman pumps 230/360/1632/1672 may be turned on and may output pump power.

Figure 26:
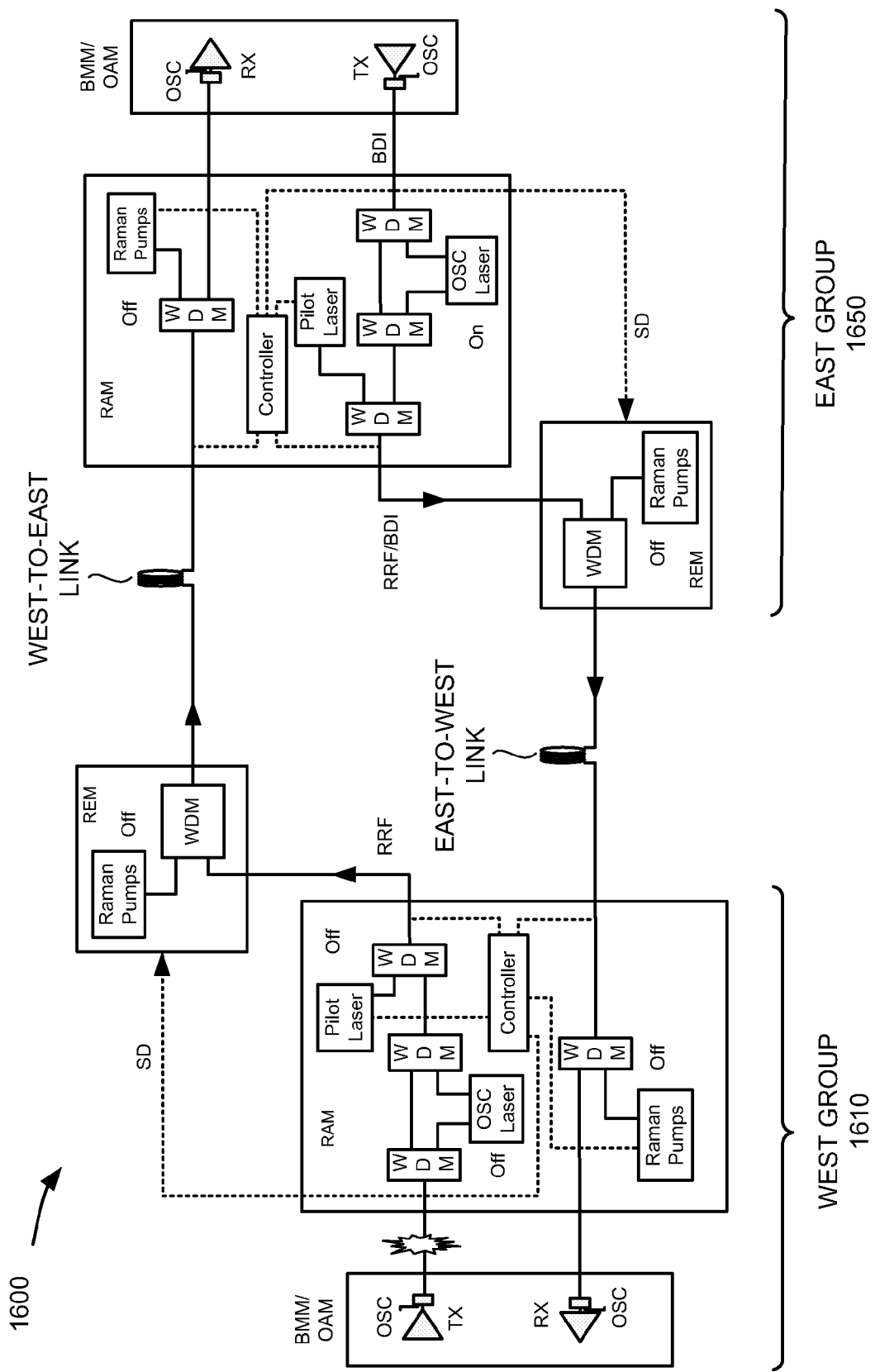
FIG. 26 is a diagram of the exemplary system of FIG. 16 in a situation where a link break occurs on a local transmit link.
Figure 27:
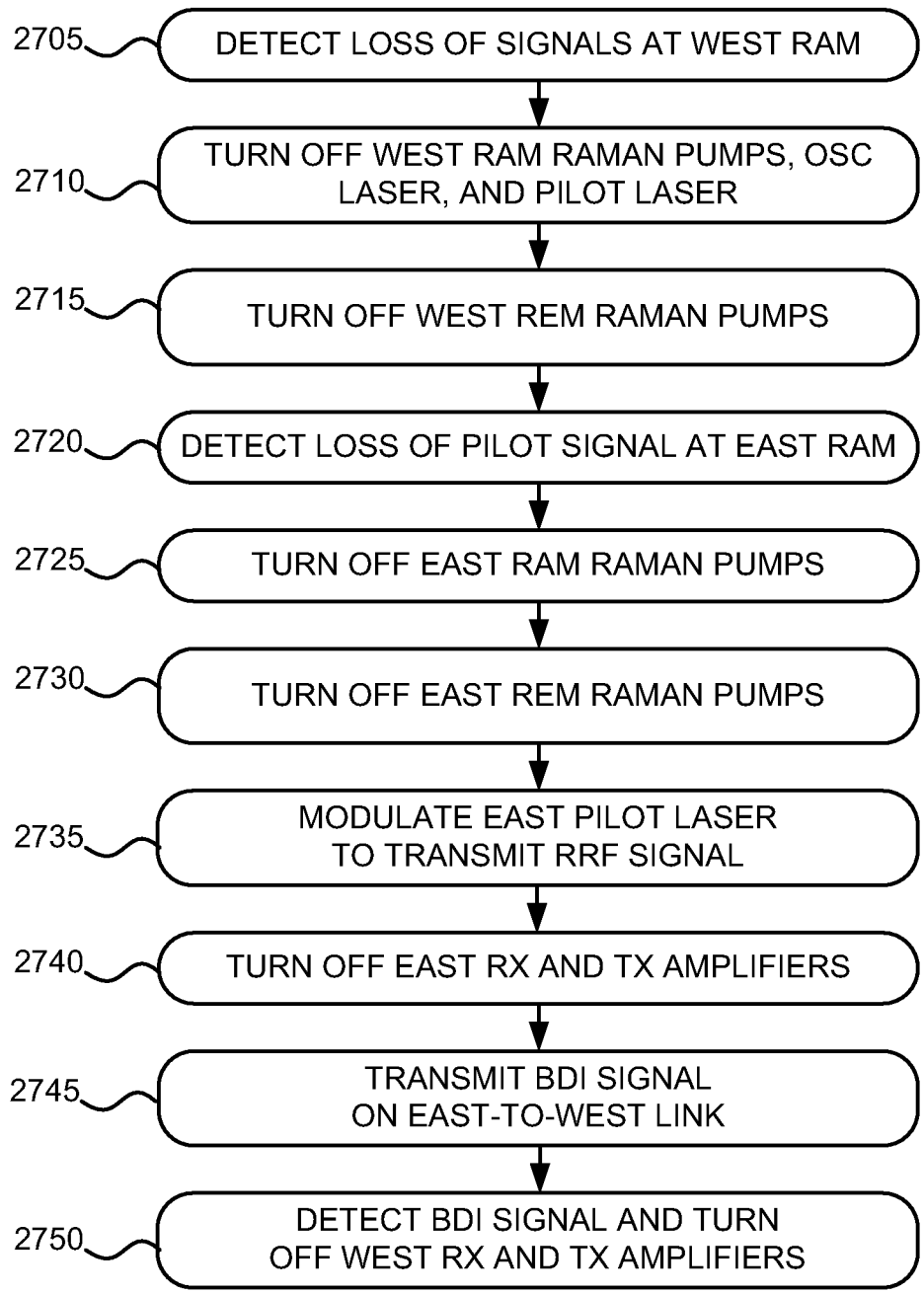
FIG. 27 is a flowchart of an exemplary process for shutting down components in response to the link break of FIG. 26.

Now assume that a link break occurs on the local transmit link located between the west BMM/OAM and the west RAM. FIG. 26 is a diagram of exemplary system 1600 in the situation where link breaks occur on the local transmit link. FIG. 27 is a flowchart of an exemplary process for shutting down components in response to the link break. In the description to follow, reference will be made to certain components of west group 1610 and east group 1650. These components will be referred to as west and east components, respectively. For example, the RAM in west group 1610 will be referred to as the west RAM, and the RAM in east group 1650 will be referred to as the east RAM.

A loss of signals (e.g., C-band payload and/or OSC signal) may be detected at the west RAM (block 2705). For example, due to the link break, the C-band payload and OSC signal outputted by the west BMM/OAM cannot reach the west RAM. The west controller (within the west RAM) may detect the absence of the C-band payload and/or OSC signal.

The west RAM Raman pumps, the west OSC laser, and the west pilot laser may be turned off (block 2710). For example, when the west controller detects the loss of the C-band payload and/or OSC signal, the west controller may send signals to the west RAM Raman pumps, the west OSC laser, and the west pilot laser to turn off. The west RAM Raman pumps, the west OSC laser, and the west pilot laser may turn off in response to the signals from the west controller, as shown in FIG. 26.

The west REM Raman pumps may be turned off (block 2715). For example, when the west controller detects the loss of the C-band payload and/or OSC signal, the west controller may generate the SD signal and send the SD signal to the west REM Raman pumps. The west REM Raman pumps may turn off in response to the SD signal from the west controller, as shown in FIG. 26.

The loss of the pilot signal may be detected at the east RAM (block 2720). For example, since the west pilot laser has been turned off, there is no pilot signal to reach the east RAM. The east controller (within the east RAM) may monitor the presence or absence of the pilot signal. In this case, the east controller may detect the absence of the pilot signal.

The east RAM Raman pumps may be turned off (block 2725). For example, when the east controller detects the loss of the pilot signal, the east controller may send a signal to the east RAM Raman pumps to turn off. The east RAM Raman pumps may turn off in response to the signal from the east controller, as shown in FIG. 26.

The east REM Raman pumps may be turned off (block 2730). For example, when the east controller detects the loss of the pilot signal, the east controller may generate the SD signal and send the SD signal to the east REM Raman pumps. The east REM Raman pumps may turn off in response to the SD signal from the east controller, as shown in FIG. 26.

The east pilot laser may be modulated to transmit the RRF signal (block 2735). For example, when the east controller detects the loss of the pilot signal, the east controller may send a signal to the east pilot laser to modulate with the RRF signal. The east pilot laser may modulate with the RRF signal in response to the signal from the east controller, as shown in FIG. 26.

The amplifiers of the east receiver and transmitter modules may be turned off (block 2740). The east receiver module may detect the loss of the C-band payload and/or OSC signal and turn off its amplifier. When the east receiver module turns off its amplifier, it triggers the east transmitter module to turn off its amplifier. The east transmitter module may then turn off its amplifier.

A BDI signal may be transmitted on the east-to-west link (block 2745). For example, when the east transmitter module turns off its amplifier, the east transmitter module may trigger the east OSC source, associated with the east transmitter module, to generate the BDI signal and output the BDI signal to the east WDM. The east WDM may optically combine the BDI signal with the pilot RRF signal and output the combined BDI signal and RRF signal on the east-to-west link.

The BDI signal may be detected and the amplifiers of the west receiver and transmitter modules may be turned off (block 2750). For example, the west receiver module may detect the BDI signal from the east transmitter module, and turn off its amplifier. When the west receiver module turns off its amplifier, it triggers the west transmitter module to turn off its amplifier. The west transmitter module may then turn off its amplifier. Both the west-to-east and the east-to-west links are now completely safe. In other words, a technician may safely repair the link break.

Figure 28:
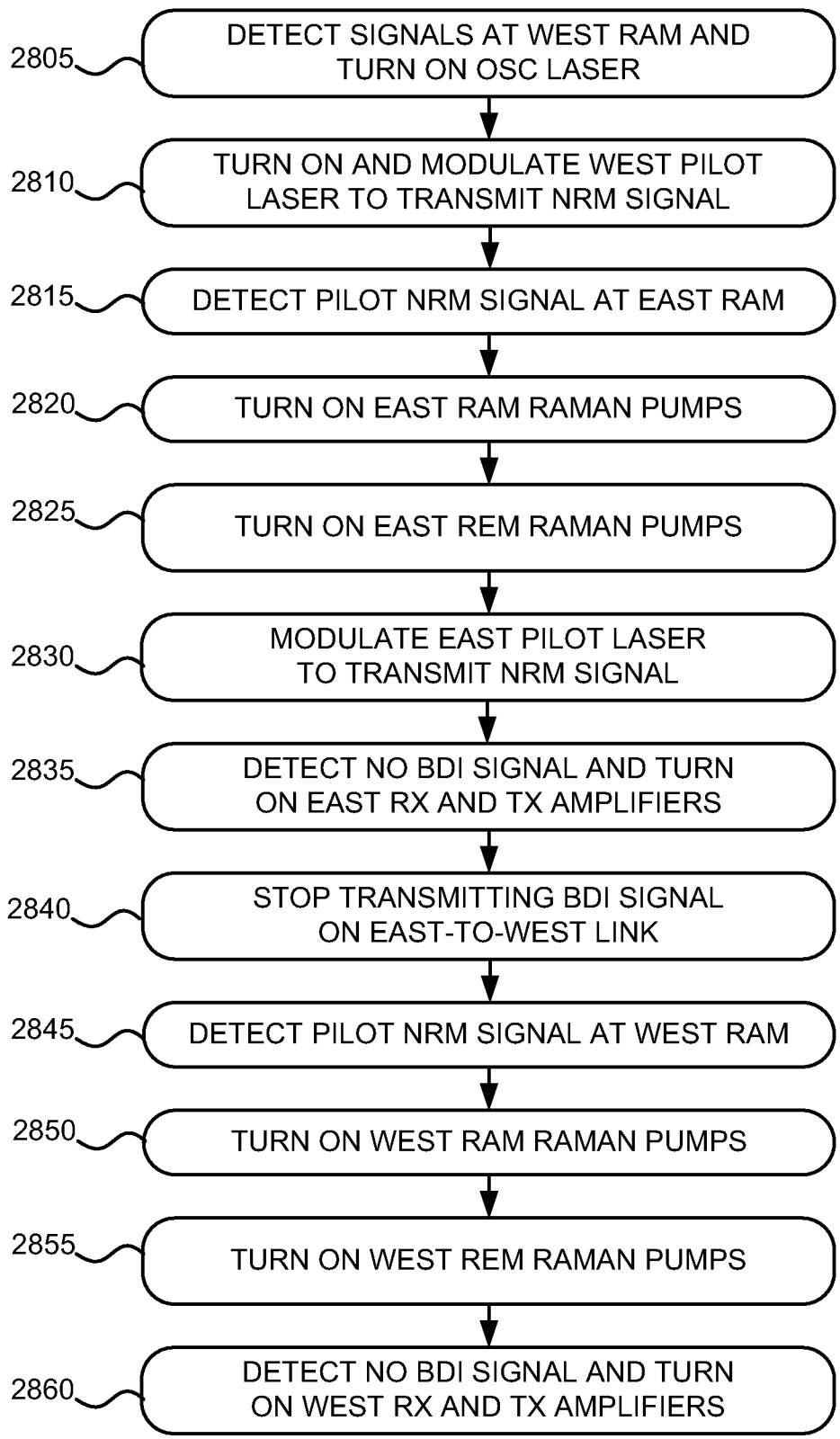
FIG. 28 is a flowchart of an exemplary process for restoring components in response to repair of the link break of FIG. 26.

FIG. 28 is a flowchart of an exemplary process for restoring components in response to repair of the link break. Signals (e.g., C-band payload and/or OSC signal) may be detected at the west RAM and west OSC laser may be turned on (block 2805). For example, due to repair of the link break, the C-band payload and OSC signal outputted by the west BMM/OAM can now reach the west RAM. The west controller (within the west RAM) may detect the restoration of the C-band payload and/or OSC signal.

The west pilot laser may be turned on and modulated to transmit the NRM signal (block 2810). For example, the west controller may detect the pilot RRF signal from the east RAM. In response, the west controller may send a signal to the west pilot laser to turn on and modulate with the NRM signal. The west RAM and REM Raman pumps may remain turned off.

The pilot NRM signal may be detected at the east RAM (block 2815). For example, now that the link break has been repaired, the pilot NRM signal outputted by the west RAM can reach the east RAM. The east controller (within the east RAM) may monitor the presence of the pilot signal and detect the NRM signal.

The east RAM Raman pumps may be turned on (block 2820). For example, when the east controller detects the pilot NRM signal, the east controller may send a signal to the east RAM Raman pumps to turn on. The east RAM Raman pumps may turn on in response to the signal from the east controller.

The east REM Raman pumps may be turned on (block 2825). For example, when the east controller detects the pilot NRM signal, the east controller may discontinue the SD signal. The east REM Raman pumps may turn on in response to the discontinuing of the SD signal from the east controller.

The east pilot laser may be modulated to transmit the NRM signal (block 2830). For example, when the east controller detects the pilot NRM signal, the east controller may send a signal to the east pilot laser to modulate with the NRM signal. The east pilot laser may modulate with the NRM signal in response to the signal from the east controller.

No BDI signal may be detected, and the amplifiers of the east receiver and transmitter modules may be turned on (block 2835). The east receiver module may detect the C-band payload and/or OSC signal, as a result of the link break being repaired, detect no BDI signal, and turn on its amplifier. When the east receiver module turns on its amplifier, it triggers the east transmitter module to turn on its amplifier. The east transmitter module may then turn on its amplifier.

The BDI signal may no longer be transmitted on the east-to-west link (block 2840). For example, when the east transmitter module turns on its amplifier, the east transmitter module may trigger the east OSC source, associated with the east transmitter module, to stop generating the BDI signal.

The pilot NRM signal may be detected at the west RAM (block 2845). For example, the west controller (within the west RAM) may monitor the signals transmitted on the east-to-west link to detect the presence of the pilot signal and to determine whether the pilot signal includes the RRF signal or the NRM signal. In this case, the west controller detects the presence of the NRM signal.

The west RAM Raman pumps may be turned on (block 2850). For example, when the west controller detects the pilot NRM signal from the east RAM, the west controller may send a signal to the west RAM Raman pumps to turn on. The west RAM Raman pumps may turn on in response to the signal from the west controller.

The west REM Raman pumps may be turned on (block 2855). For example, when the west controller detects the pilot NRM signal, the west controller may discontinue the SD signal. The west REM Raman pumps may turn on in response to the discontinuing of the SD signal from the west controller.

No BDI signal may be detected on the east-to-west link, and the amplifiers of the west receiver and transmitter modules may be turned on (block 2860). For example, the west receiver module may detect the removal of the BDI signal from the east transmitter module, and turn on its amplifier. When the west receiver module turns on its amplifier, it triggers the west transmitter module to turn on its amplifier. The west transmitter module may then turn on its amplifier. As a result, system 1600 may return to normal operation.

Conclusion

Implementations described herein may facilitate shutdown and recovery in response to link breaks. Table 1 summarizes the operation described above and the effects on the RAM and REM Raman pumps, the OSC laser, and the pilot laser. The OSC laser column is applicable for RAMs that include OSC lasers. The REM pumps column is applicable for configurations that incorporate a REM.

TABLE 1

| State Description | Shutdown Event | RAM Pumps | REM Pumps | OSC Laser | Pilot Laser |
|---|---|---|---|---|---|
| No pilot signal (RRF or NRM) detected and C-band or OSC signal detected at BMM/OAM. This indicates a fiber break in the main fiber span. | YES | OFF | OFF | ON | RRF |
| Neither C-band nor OSC detected at the BMM/OAM port. This indicates a fiber break between the local BMM/OAM and RAM. | YES | OFF | OFF | OFF | OFF |
| RRF signal detected and C-band or OSC signal detected at BMM/OAM. This indicates a fiber break has been detected by the RX side of the upstream amplifier. | YES | OFF | OFF | ON | NRM |
| NRM signal detected and C-band or OSC signal detected at BMM/OAM. No fiber break. | NO | ON | ON | ON | NRM |

When a link break is detected due to the loss of the pilot signal (RRF and NRM), and there is no link break on the local link between the BMM/OAM and the RAM, the RAM may shut down its pumps and modulate its pilot laser to output the RRF signal to the RAM downstream of the break. If applicable, the RAM may also shut down the REM pumps by asserting the SD signal. The pumps are turned off to provide a safe condition as well as to remove any noise from the BMM/OAM receiver.

When a link break is detected at the BMM/OAM due to a loss of the C-band payload and/or the OSC signal, the RAM may shut down its pumps, OSC laser, and pilot laser. If applicable, the RAM may also shut down the REM pumps by asserting the SD signal. The OSC laser may be shut down because without a valid OSC input signal, the OSC laser may generate noise on the OSC channel. This noise may be detected by the far end BMM/OAM receiver as optical energy that the BMM/OAM may confuse as the OSC signal, causing the BMM/OAM not to output a BDI signal. Without this BDI signal, the amplifier associated with the local transmitter module may not turn off, resulting in an unsafe condition. Accordingly, the pilot laser may be turned off to simulate a link break on the main fiber span for the remote RAM.

When the RRF pilot signal is detected and there is no link break on local link between the BMM/OAM and the RAM, the RAM may shut down its pumps and modulate its pilot laser to output a NRM signal to the far end RAM. If applicable, the RAM may also shut down the REM pumps by asserting the SD signal.

When the NRM pilot signal is detected and there is no fiber break on the local link between the BMM/OAM and the RAM, the RAM may turn on its pumps and modulate its pilot laser to output a NRM signal to the far end RAM. If applicable, the RAM may also enable the REM pumps by de-asserting the SD signal. When the RAM de-asserts the SD signal, the REM pumps may be turned on only if there is no link break in the short fiber span between the RAM and the REM. In other words, if the REM detects either the pilot signal, the C-band payload, or the OSC signal from the RAM and the SD signal is de-asserted, then the REM may turn on its pumps.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 6, 8, 9, 11, 12, 14, 15, 18, 19, 21, 22, 24, 25, 27, and 28, the order of the blocks may be modified in other implementations. Further, non-dependent blocks may be performed in parallel.

Further, the term "approximately" has been used throughout the description and is intended to mean the exact number or range that follows the term or a number within a particular threshold of the number or range that follows the term.

Also, while signals of particular exemplary wavelengths have been described, one or more of these signals may have a different wavelength, or operate within a different range of wavelengths, in other implementations.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A communication system, comprising:
   a first optical source configured to supply a first optical signal to a first optical link, the first optical signal propagating in a first direction along the first optical link;
   a second optical source configured to supply a second optical signal to a second optical link, the second optical signal propagating in the first direction along the second optical link;
   a first control circuit configured to:
      detect an absence of the first optical signal on the first optical link resulting from a break in the first optical link, and
      output a first signal in response to detecting the absence of the first optical signal;
   a third optical source configured to supply a third optical signal to the second optical link in response to the first signal, the third optical signal propagating in a second direction different than the first direction;
   a second control circuit configured to:
      detect a presence of the third optical signal on the second optical link, and
      output a second signal in response to detecting the presence of the third optical signal; and
   a fourth optical source configured to supply a plurality of fourth optical signals to the second optical link, the plurality of fourth optical signals propagating along the second optical link in the second direction;
   an optical supervisory channel transmitter configured to supply an optical supervisory channel to the second optical link, the optical supervisory channel propagating in the second direction and carrying information indicative of the break in the first optical link; and
   a transmitter amplifier coupled to the first optical link,
   where the second optical source is disabled in response to the second optical signal, and the second optical signal provides Raman gain to the fourth optical signal, and the transmitter amplifier is disabled in response to the optical supervisory channel.

2. The communication system of claim 1, where each of the first optical signal and the third optical signal has a wavelength of approximately 1610 nm.

3. The communication system of claim 1, where the third optical source is configured to modulate the third optical signal as a modulated third optical signal based on the first signal, the modulated third optical signal indicating, to the second control circuit, to disable the second optical source, where the second control circuit is configured to output the second signal in response to detecting the modulated third optical signal.

4. The communication system of claim 1, further comprising:
   a fifth optical source configured to supply a fifth optical signal to the first optical link, the fifth optical signal propagating in the second direction along the first optical link.

5. The communication system of claim 4, where the first control circuit is further configured to output a third signal in response to detecting the absence of the first optical signal, where the fifth optical source is disabled in response to the third signal.

6. The communication system of claim 5, where the first control circuit is further configured to:
   detect a presence of the first optical signal on the first optical link, and
   output a fourth signal in response to detecting the presence of the first optical signal on the first optical link, where the fifth optical source is enabled in response to the fourth signal.

7. The communication system of claim 4, where the second control circuit is further configured to output a third signal in response to detecting the third optical signal, the third signal causing the first optical source to modulate the first optical signal as a modulated first optical signal, the modulated first optical signal indicating, to the first control circuit, to enable the fifth optical source.

8. The communication system of claim 7, where the first control circuit is further configured to:
   detect a presence of the modulated first optical signal on the first optical link, and
   output a fourth signal in response to detecting the presence of the modulated first optical signal, where the fifth optical signal is enabled in response to the fourth signal.

9. The communication system of claim 1, where the first control circuit is further configured to:
   detect a presence of the first optical signal on the first optical link, and
   output a third signal in response to detecting the presence of the first optical signal on the first optical link, where the third signal causes the third optical source to modulate the third optical signal as a modulated third optical signal, the modulated third optical signal indicating, to the second control circuit, to enable the second optical source.

10. The communication system of claim 9, where the second control circuit is further configured to:
   detect a presence of the modulated third optical signal on the second optical link, and
   output a fourth signal in response to detecting the presence of the third optical signal, where the second optical source is enabled in response to the fourth signal.

11. The communication system of claim 1, further comprising:
   a fifth optical source supplying a fifth optical signal to the second optical link, the fifth optical signal propagating in the second direction along the second optical link.

12. The communication system of claim 11, where the first control circuit is further configured to output a third signal in response to detecting the absence of the first optical signal, where the fifth optical source is disabled in response to the third signal.

13. The communication system of claim 12, where the first control circuit is further configured to:
   detect a presence of the first optical signal on the first optical link, and
   output a fourth signal in response to detecting the presence of the first optical signal on the first optical link, where the fifth optical source is enabled in response to the fourth signal.

14. The communication system of claim 11, where the second control circuit is further configured to output a third signal in response to detecting the presence of the third optical signal, the third signal causing the first optical source to modulate the first optical signal as a modulated first optical signal, the modulated first optical signal indicating to the first control circuit to enable the fifth optical source.

15. The communication system of claim 1, further comprising:
   a fifth optical source supplying a fifth optical signal to the first optical link, the fifth optical signal propagating in the first direction along the first optical link.

16. The communication system of claim 15, where the second control circuit is further configured to output a third signal in response to detecting the third optical signal, where the fifth optical source is disabled in response to the third signal.

17. The communication system of claim 1, further comprising:
   a fifth optical source supplying a fifth optical signal to the second optical link, the fifth optical signal propagating in the second direction along the second optical link; and
   a sixth optical source supplying a sixth optical signal to the first optical link, the sixth optical signal propagating in the first direction along the first optical link.

18. A communication system, comprising:
   a first control circuit configured to detect a break on a first optical link;
   a pilot laser configured to supply a first optical signal on a second optical link in response to detecting the break on the first optical link, the first optical signal propagating in a first direction on the second optical link;
   a second control circuit configured to:
      detect a presence of the first optical signal on the second optical link, and
      output a first control signal in response to detecting the presence of the first optical signal;
   a Raman pump configured to supply a second optical signal on the second optical link, the second optical signal propagating in a second direction opposite the first direction,
   an optical supervisory channel transmitter configured to supply a first optical supervisory channel to the second optical link, the first optical supervisory channel configured to carry information indicative of the break in the first optical link; and
   a transmitter amplifier coupled to the first optical link,
   where the Raman pump is disabled in response to the first control signal, and the transmitter amplifier is disabled in response to the first optical supervisory channel.

19. The communication system of claim 18, further comprising:
   another Raman pump configured to supply a third optical signal on the second optical link, the third optical signal propagating in the first direction.

20. The communication system of claim 18, where the first control circuit is further configured to detect repair of the break on the first optical link;
   where the pilot laser is further configured to supply a third optical signal on the second optical link in response to detecting the repair of the break on the first optical link;
   where the second control circuit is further configured to:
      detect a presence of the third optical signal on the second optical link, and
      output a second control signal in response to detecting the presence of the third optical signal;
   where the Raman pump is enabled in response to the second control signal;
   where the optical supervisory channel transmitter is further configured to:
      supply a second optical supervisory channel to the second optical link,
      wherein the second optical supervisory channel is further configured to carry information indicative of the repair in the first optical link; and
   where the transmitter amplifier is enabled in response to the second optical supervisory channel.

21. A method, comprising:
   supplying a first optical signal on a first optical link, the first optical signal propagating in a first direction on the first optical link;
   supplying a second optical signal on the first optical link, the second optical signal propagating in a second direction, that is opposite the first direction, on the first optical link;
   detecting an absence of the first optical signal on the first optical link resulting from a break in the first optical link;
   disabling the supplying of the second optical signal on the first optical link in response to detecting the absence of the first optical signal;
   supplying a third optical signal on a second optical link in response to detecting the absence of the first optical signal, the third optical signal propagating in the second direction on the second optical link;
   supplying a fourth optical signal on the second optical link, the fourth optical signal propagating in the first direction on the second optical link;
   detecting a presence of the third optical signal on the second optical link;
   disabling the supplying of the fourth optical signal on the second optical link in response to detecting the presence of the third optical signal;
   supplying an optical supervisory channel to the second optical link in response to the break in the first optical link; and
   disabling a transmitter amplifier in response to the optical supervisory channel.

22. The method of claim 21, further comprising:
detecting a presence of the first optical signal on the first optical link; and
enabling the supplying of the second optical signal on the first optical link in response to detecting the presence of the first optical signal.

23. The method of claim 21, further comprising:
supplying a fifth optical signal on the first optical link, the fifth optical signal propagating in the first direction on the first optical link; and
disabling the supplying of the fifth optical signal on the first optical link in response to detecting the presence of the third optical signal.

24. The method of claim 21, further comprising:
supplying a fifth optical signal on the second optical link, the fifth optical signal propagating in the second direction on the second optical link; and
disabling the supplying of the fifth optical signal on the second optical link in response to detecting the absence of the first optical signal.

25. The method of claim 21, further comprising:
supplying a fifth optical signal on the first optical link, the fifth optical signal propagating in the first direction on the first optical link;
disabling the supplying of the fifth optical signal on the first optical link in response to detecting the presence of the third optical signal;
supplying a sixth optical signal on the second optical link, the sixth optical signal propagating in the second direction on the second optical link; and
disabling the supplying of the sixth optical signal on the second optical link in response to detecting the absence of the first optical signal.

* * * * *